United States Patent
Koyanagi et al.

[11] Patent Number: 6,125,145
[45] Date of Patent: Sep. 26, 2000

[54] MOTION DETECTION APPARATUS AND MOTION DETECTION METHOD

[75] Inventors: Masakazu Koyanagi; Tadafusa Tomitaka, both of Chiba; Taro Suito, Kanagawa; Naoyasu Hosonuma, Saitama, all of Japan

[73] Assignee: Sony Corporation, Tokyo, Japan

[21] Appl. No.: 08/771,678

[22] Filed: Dec. 23, 1996

[30] Foreign Application Priority Data

Dec. 28, 1995 [JP] Japan ............................. 7-342431

[51] Int. Cl.[7] ........................... H04B 1/66; H04N 5/14
[52] U.S. Cl. ............... 375/240.16; 348/699; 348/413.1
[58] Field of Search ............................ 348/699, 169, 348/170, 171, 172, 152, 156, 161, 129, 131, 138, 142, 153, 154, 155, 130, 407, 412, 413, 415, 416, 413.1; 382/107; 375/240, 240.16

[56] References Cited

U.S. PATENT DOCUMENTS

| | | | |
|---|---|---|---|
| 5,111,511 | 5/1992 | Ishii et al. ........................... | 348/699 |
| 5,386,234 | 1/1995 | Veltman et al. ..................... | 348/413 |
| 5,729,295 | 3/1998 | Okada ................................. | 348/416 |
| 5,731,832 | 3/1998 | Ng ...................................... | 348/699 |
| 5,760,846 | 6/1998 | Lee ..................................... | 348/699 |
| 5,764,294 | 6/1998 | Fukuda et al. ...................... | 348/699 |
| 5,847,755 | 12/1998 | Wixson et al. ...................... | 348/155 |

OTHER PUBLICATIONS

Mathis, S. et al: "Real–Time Movement Detection", Signal Processing v: Theories and Applications, L. Torres; E. Masgrau; M. A. Lagunas; Barcelona, Sep. 18–21, 1990, vol. 3, Sep. 18, 1990, Torres L.; Masgrau E.; Lagunas M A.; pp. 1759–1762, XP000365906.

Tadashi Nakanishi et al: "Automatic Vehicle Image Extraction Based on Spatio–Temporal Image Analysis", Systems & Computers in Japan, vol. 26, No. 12, Nov. 1, 1995, pp. 71–81, XP000542099.

Patent Abstracts of Japan, vol. 013, No. 172 (p–862), Apr. 24, 1989 of JP 01 007174 Jan. 11, 1989.

*Primary Examiner*—Chris S. Kelley
*Assistant Examiner*—Gims Philippe
*Attorney, Agent, or Firm*—Frommer Lawrence & Haug, LLP.; William S. Frommer; Bruno Polito

[57] ABSTRACT

A motion detection system for detecting motion in input images. One of the input images is stored for use as a reference image for motion detection processing. The reference image is updated according to any one of a multiple of possible updating modes. Images input after establishment of the reference image are compared to the reference image and the detection of motion in the input images is based on the comparison. The interval in which motion in the input images is detected is extended according to a predetermined extension time.

29 Claims, 15 Drawing Sheets

FIG.1

| FIG.1A | FIG.1B |

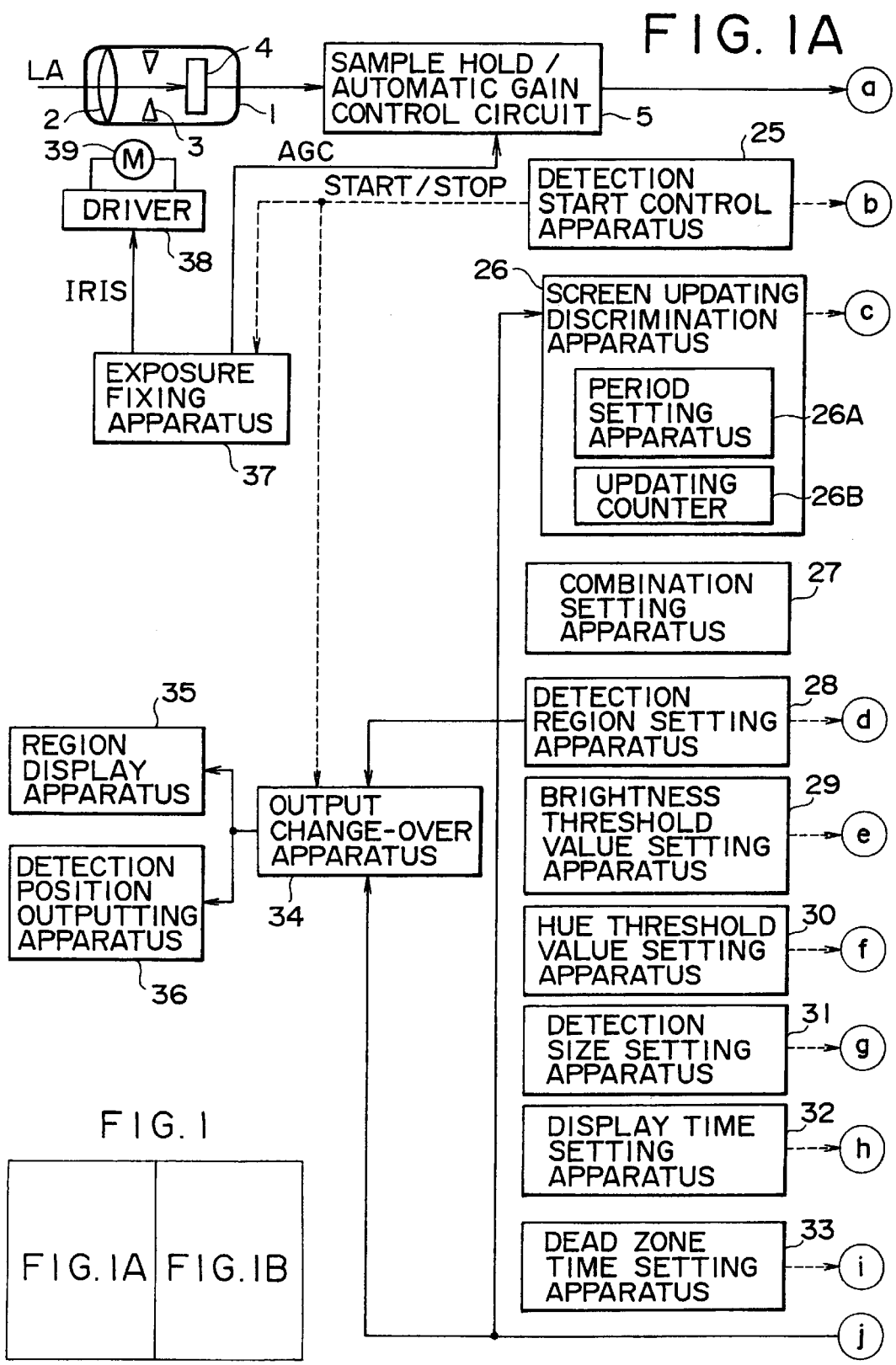

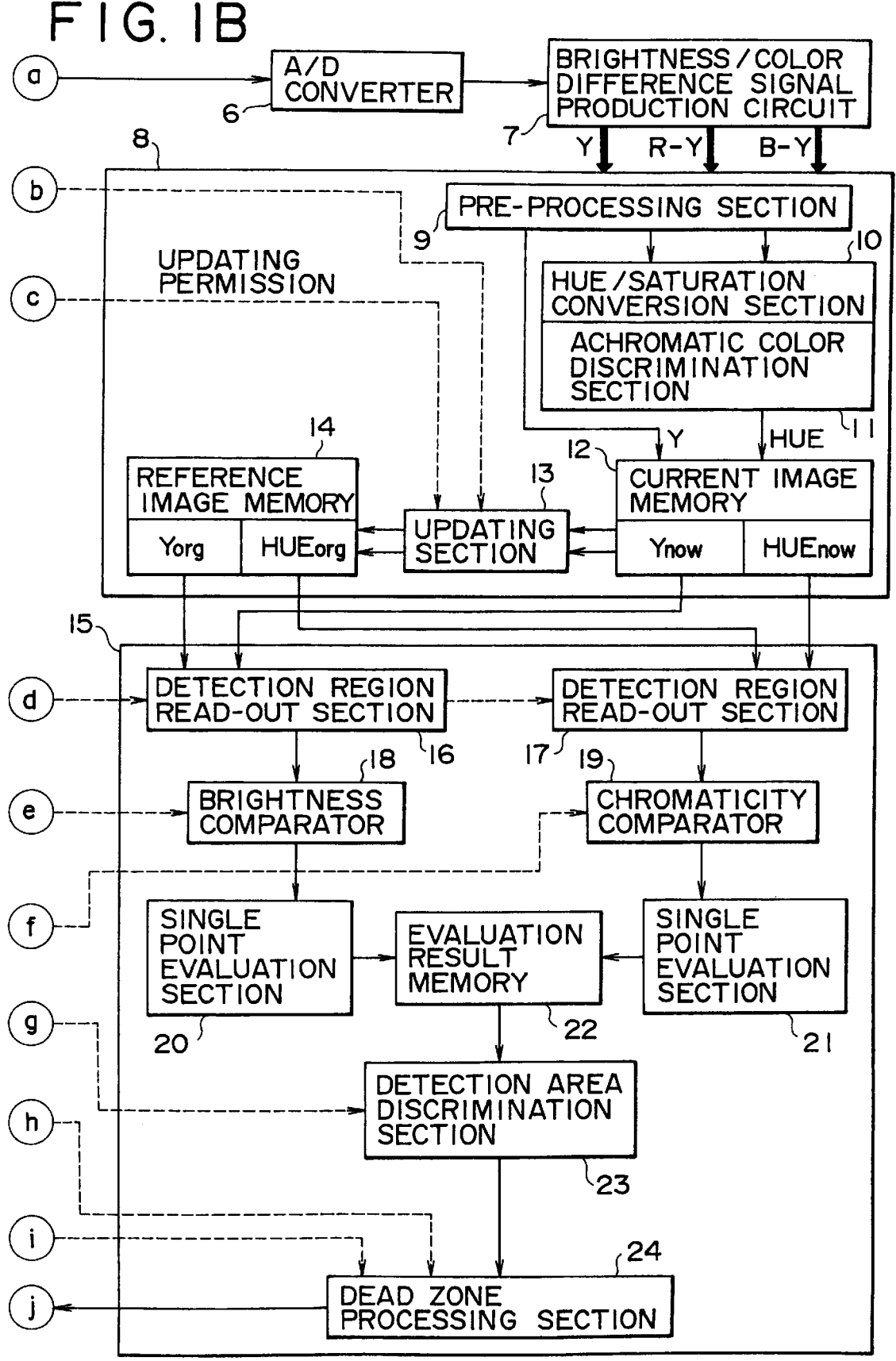

SETTING IMAGE WHEN TO PERFORM MOTION DETECTION OF DOOR (DISCRIMINATE FOR ARBITRARY ONE LOCATION)

SETTING IMAGE WHEN TO OBSERVE MODE OF LIFE OF ANIMAL (FULL SCREEN IS SET)

SETTING IMAGE TO SUPERVISE THAT MANDARIN ORANGE AND CHERRIES DISAPPEAR (DISCRIMINATE FOR PLURALITY OF ARBITRARY LOCATIONS)

IMAGE OF DETECTION REGION SETTING

WHEN NO VARIATION IS DETECTED WITH REGARD TO ALL PIXELS IN SQUARE INCLUDING PIXELS FROM WHICH MOTION HAS BEEN DETECTED, VARIATION OF PIXEL IS DETERMINED AS ORIGINATING FROM NOISE AND IS NOT REGARDED AS VARIATION POINT

INSPECTION LOCATIONS FOR SQUARE OF 2×2 PIXELS

BEFORE PROCESSING

AFTER PROCESSING

7 BRIGHTNESS VARIATION POINTS

+

6 HUE VARIATION POINTS

=

9 VARIATION POINTS

ORIGINAL IMAGE AND
DETECTION SETTING
POSITION

WHEN, FOR EXAMPLE,
CHAIR AND APPLE
DISAPPEAR

VARIATION IMAGE

FIG. 7A STATE DETECTED ONLY USING SCREEN DIFFERENCE

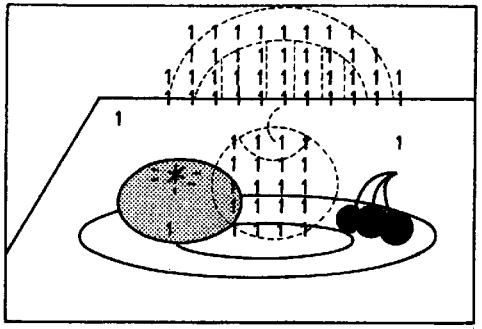

1 DENOTES PORTION DETECTED IN TERMS OF BRIGHTNESS (PORTIONS FROM WHICH CHAIR HAS DISAPPEARED ARE DETECTED IN BRIGHTNESS)

FIG. 7B

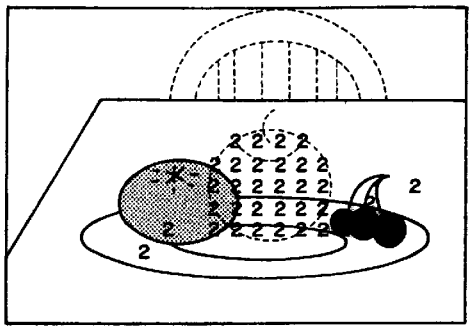

2 DENOTES PORTION DETECTED IN TERMS OF HUE (MOST PART OF APPLE IS DETECTED IN HUE)

FIG. 7C ↓ STATE AFTER ISOLATED POINT REMOVAL IS PERFORMED

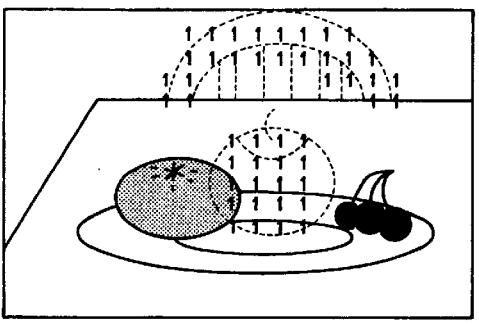

FIG. 7D ↓

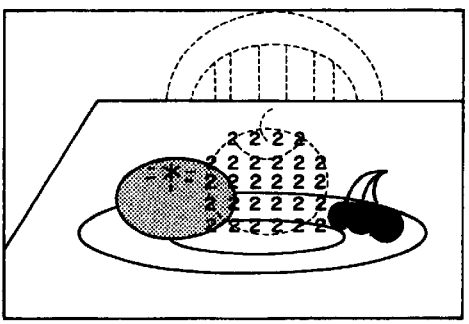

FIG. 7E ↓

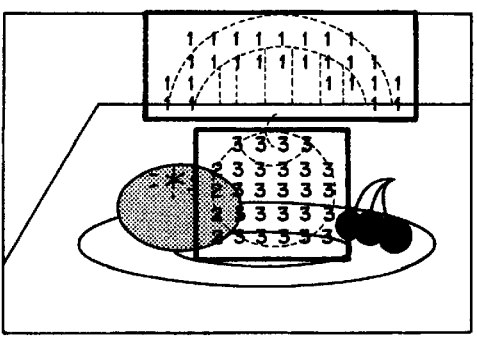

COMBINED STATE OF TWO SCREENS

3 DENOTES PORTION DETECTED IN TERMS OF BOTH OF BRIGHTNESS AND HUE

☐ DENOTES PORTION WITH WHICH MOTION HAS BEEN DETECTED

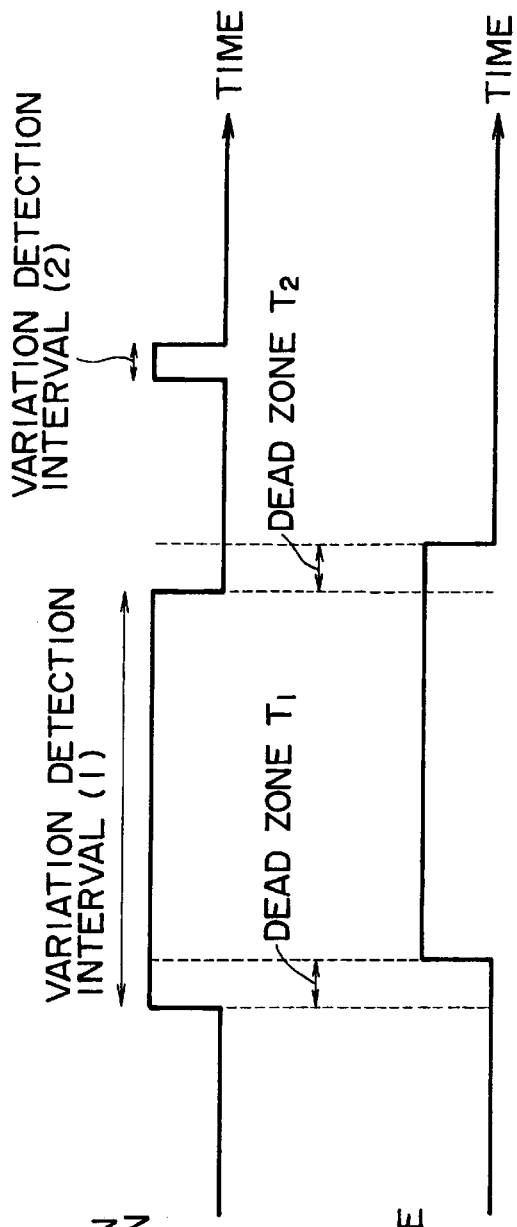

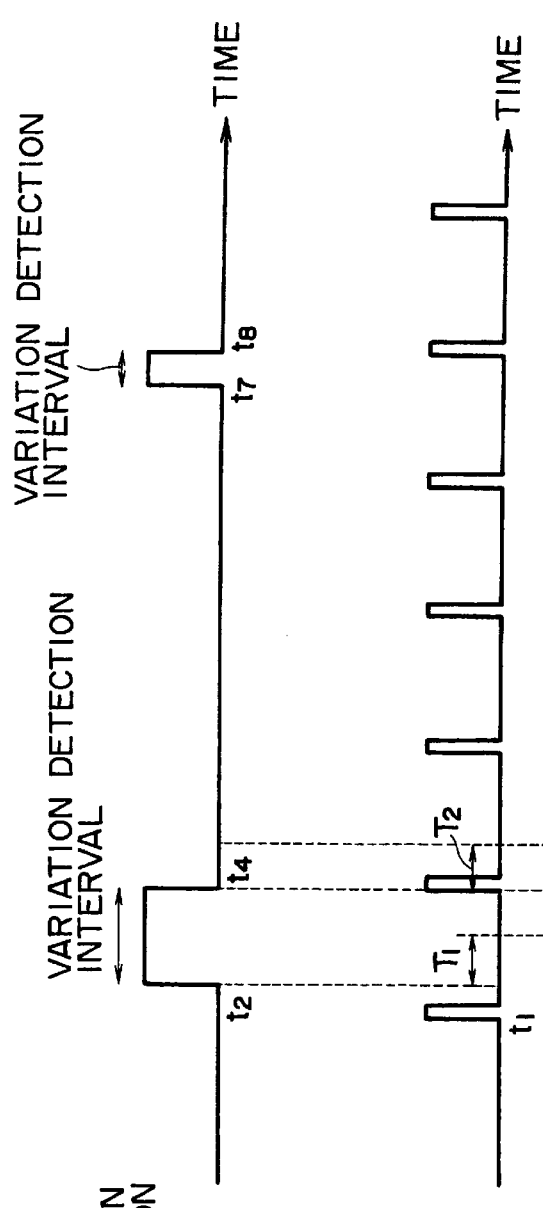

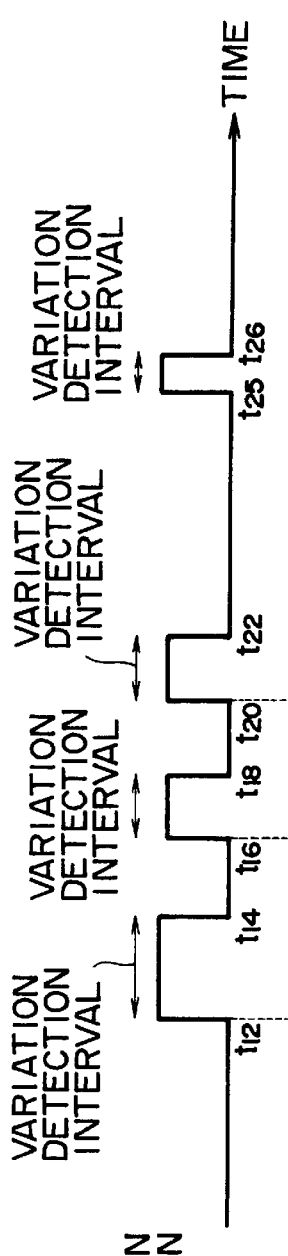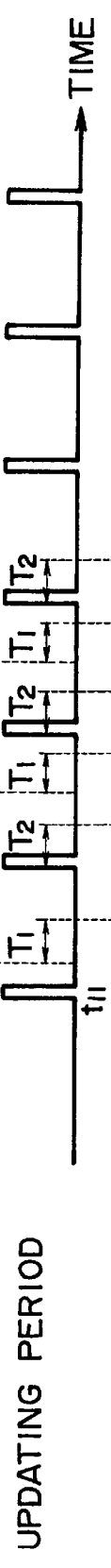

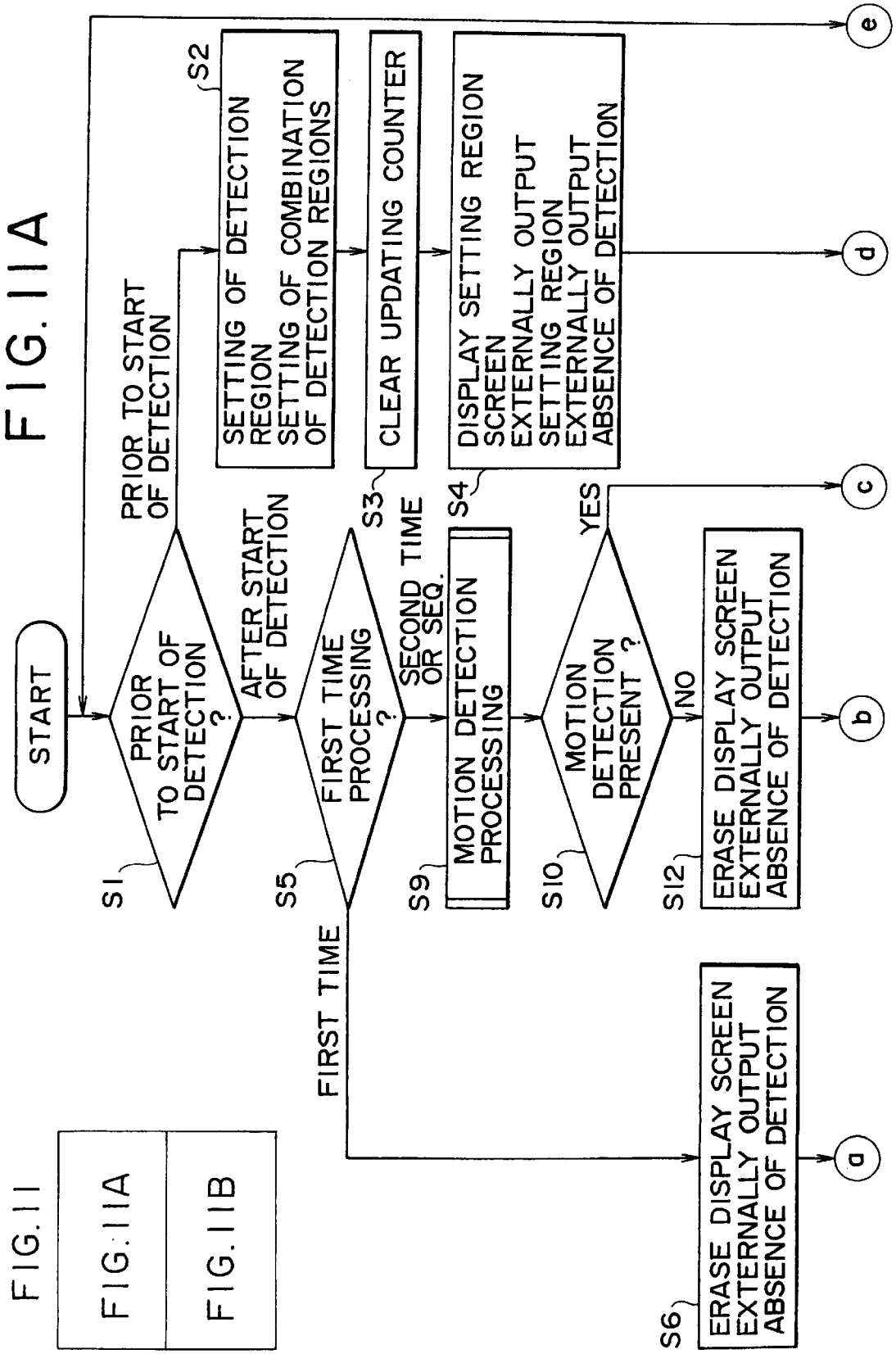

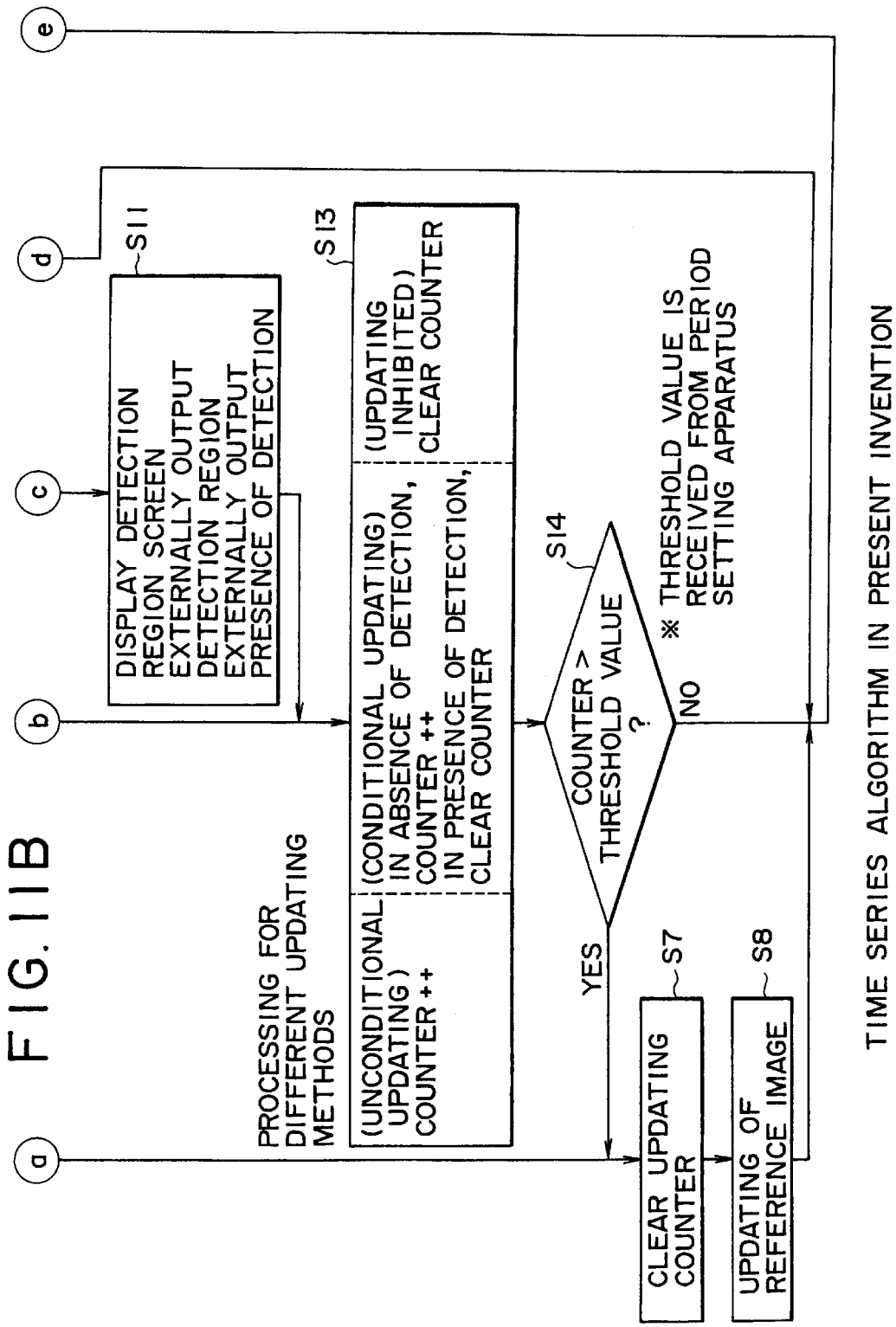

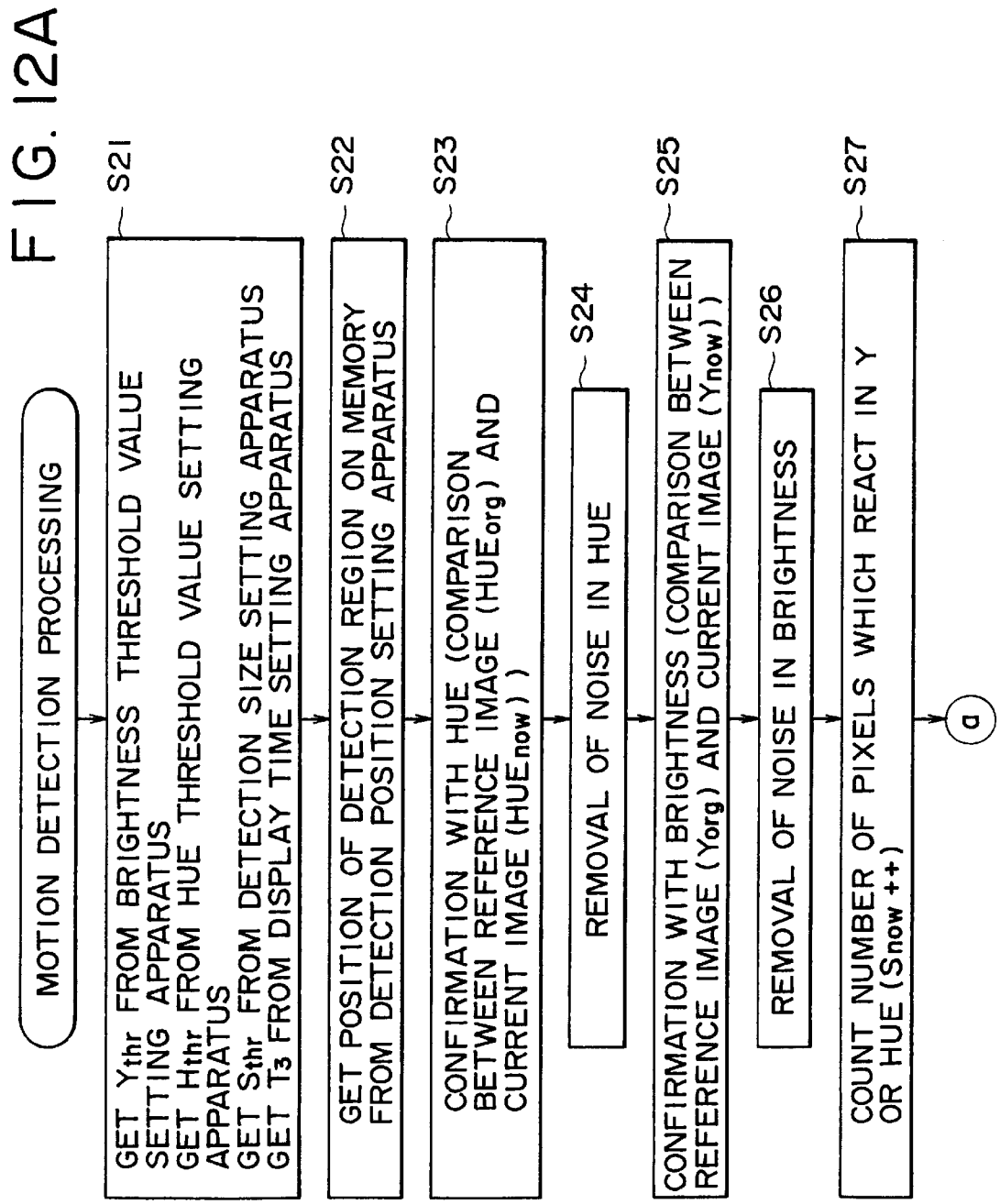

MOTION DETECTION APPARATUS AND MOTION DETECTION METHOD

BACKGROUND OF THE INVENTION

This invention relates to a motion detection apparatus and a motion detection method, and more particularly to a motion detection apparatus and a motion detection method for use in a video camera, for example, for supervision or inspection.

In an ordinary video camera, for example, for supervision, an image formed upon starting of detection is selected as a reference image for detection of motion. Then, each of images successively imaged and inputted thereafter, that is, a current image, is compared with the reference image to detect motion of the image, that is, the current image, with respect to the reference image.

However, in such an ordinary video camera as described above, comparison between a reference image and a current image is performed only with regard to the brightness. Consequently, where supervision by means of the video camera is performed for a long time, because of an influence of a variation in environmental light, it is sometimes detected in error that motion has occurred with an image.

Further, where an automatic exposure adjustment apparatus or automatic iris is provided in the video camera, if a body enters a photographing scene, then since the exposure of the entire current image is changed, it sometimes occurs that, where the video camera has a high detection sensitivity, it is determined in error that motion has occurred not only in the region into which the body has entered but also in some other region.

Further, in such an ordinary video camera as described above, since parameters which are used for detection of motion of an image such as, for example, a detection sensitivity or a timing at which a reference image is stored are fixed, detection of motion can be performed only in a standardized fashion.

SUMMARY OF THE INVENTION

It is an object of the present invention to provide a motion detection apparatus and a motion detection method wherein motion detection can be performed with augmented accuracy and flexibly in response to a demand of a user.

In order to attain the object described above, according to an aspect of the present invention, there is provided a motion detection apparatus for detecting motion of an inputted image, including reference image storage means for storing the image as a reference image to be used as a reference for detection of motion, updating means for periodically updating the reference image stored in the reference image storage means, current image storage means for storing an image inputted now as a current image, motion detection means for comparing the current image stored in the current image storage means with the reference image stored in the reference image storage means and detecting motion of the image based on a result of the comparison, and extension means for extending an interval within which motion of the image is detected by the motion detection means by a predetermined extension time.

In the motion detection apparatus, the reference image storage means stores an image as a reference image to be used as a reference for detection of motion, and the updating means periodically updates the reference image stored in the reference image storage means. The current image storage means stores an image inputted now as a current image, and the motion detection means compares the current image stored in the current image storage means with the reference image stored in the reference image storage means and detects motion of the image based on a result of the comparison. The extension means extends an interval within which motion of the image is detected by the motion detection means by a predetermined extension time.

According to another aspect of the present invention, there is provided a motion detection method for detecting motion of an inputted image, including the steps of periodically updating and storing the image as a reference image to be used as a reference for detection of motion and storing an image inputted now as a current image, comparing the reference image and the current image with each other and detecting motion of the image based on a result of the comparison, and extending an interval within which motion of the image is detected by a predetermined time.

In the motion detection method, an image is periodically updated and stored as a reference image to be used as a reference for detection of motion and an image inputted now is stored as a current image, and the reference image and the current image are compared with each other and motion of the image is detected based on a result of the comparison, and then an interval within which motion of the image is detected is extended by a predetermined time.

In the motion detection apparatus and the motion detection method described above, an image is stored and periodically updated as a reference image to be used as a reference for detection of motion and an image inputted now is stored as a current image, and then the reference image and the current image are compared with each other and motion of the image is detected based on a result of the comparison. Then, when motion of the image is detected, the interval for which such detection continues is extended by the predetermined time. Accordingly, it can be prevented, for example, that motion is missed.

According to a further aspect of the present invention, there is provided a motion detection apparatus for detection motion of an inputted image, including reference image storage means for storing the image as a reference image to be used as a reference for detection of motion, updating means for updating the reference image stored in the reference image storage means, current image storage means for storing an image inputted now as a current image, motion detection means for comparing the current image stored in the current image storage means with the reference image stored in the reference image storage means and detecting motion of the image based on a result of the comparison, and selection means for selecting an updating method of the reference image by the updating means from among a plurality of methods.

In the motion detection apparatus, the reference image storage means stores an image as a reference image to be used as a reference for detection of motion, and the updating means updates the reference image stored in the reference image storage means. The current image storage means stores an image inputted now as a current image, and the motion detection means compares the current image stored in the current image storage means with the reference image stored in the reference image storage means and detects motion of the image based on a result of the comparison. The selection means selects an updating method of the reference image by the updating means from among a plurality of methods.

According to a still further aspect of the present invention, there is provided a motion detection method for the motion detection apparatus described above, wherein an updating method of the reference image by the updating means is selectable from among a plurality of methods.

In the motion detection method, an updating method of a reference image by the updating means is selectable from among a plurality of methods.

In the motion detection apparatus and the motion detection method described above, the updating method by the updating means for updating the reference image to be used as a reference for detection of motion can be selected from among a plurality of methods. Accordingly, an updating method suitable for a situation in which motion is detected can be selected.

According to a yet further aspect of the present invention, there is provided a motion detection apparatus for detection motion of an inputted image, including reference image storage means for storing the image as a reference image to be used as a reference for detection of motion, current image storage means for storing an image inputted now as a current image, brightness information comparison means for comparing brightness information regarding brightness of the current image stored in the current image storage means and the reference image stored in the reference image storage means each other, color information comparison means for comparing color information regarding colors of the current image stored in the current image storage means and the reference image stored in the reference image storage means each other, and motion detection means for detecting motion of the image based on results of the comparison by both of the brightness information comparison means and the color information comparison means.

In the motion detection apparatus, the reference image storage means stores an image as a reference image to be used as a reference for detection of motion, and the current image storage means stores an image inputted now as a current image. The brightness information comparison means compares brightness information regarding brightness of the current image stored in the current image storage means and the reference image stored in the reference image storage means each other, and the color information comparison means compares color information regarding colors of the current image stored in the current image storage means and the reference image stored in the reference image storage means each other. The motion detection means detects motion of the image based on results of the comparison by both of the brightness information comparison means and the color information comparison means.

According to a yet further aspect of the present invention, there is provided a motion detection method for detecting motion of an inputted image, including the steps of storing the image as a reference image to be used as a reference for detection of motion and storing an image inputted now as a current image, comparing brightness information regarding brightness of the reference image and the current image with each other and comparing color information regarding a color between the reference image and the current image with each other, and detecting motion of the image based on both of results of the comparison.

In the motion detection method, an image is stored as a reference image to be used as a reference for detection of motion and an image inputted now is stored as a current image, and brightness information regarding brightness of the reference image and the current image is compared with each other and color information regarding a color between the reference image and the current image is compared with each other, and then motion of the image is detected based on both of results of the comparison.

In the motion detection apparatus and the motion detection method described above, an image is stored as a reference image to be used as a reference for detection of motion, and an image inputted now is stored as a current image. Then, brightness information of the brightnesses of the reference image and the current image is compared with each other, and color information of the colors of the reference image and the current image is compared with each other. Then, based on both results of the comparison, motion of the image is detected. Accordingly, motion can be detected with a high degree of accuracy.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is a block diagram showing a construction of a video camera system to which the present invention is applied;

FIGS. 7A to 7E are schematic views illustrating different motion detection processing of the motion detection apparatus shown in FIG. 1;

FIGS. 8A and 8B are waveform diagrams illustrating dead zone processing of a dead zone processing section shown in FIG. 1;

FIGS. 9A to 9C are waveform diagrams illustrating display time extension processing of the dead zone processing section shown in FIG. 1;

FIGS. 10A to 10C are waveform diagrams illustrating a different phase of display time extension processing of the dead zone processing section shown in FIG. 1;

FIGS. 11 and 12 are flow charts illustrating operation of the video camera system of FIG. 1.

DESCRIPTION OF THE PREFERRED EMBODIMENTS

Figure 2A:
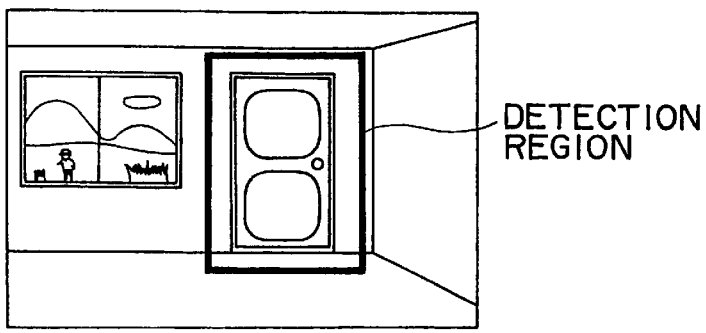
FIGS. 2A to 2C are schematic views illustrating setting of a detection region by the video camera system shown in FIG. 1.

Before a preferred embodiment of the present invention is described, in order to clearly indicate a corresponding relationship between various features of the invention set forth in the claims and the embodiment described hereinbelow, characteristics of the present invention will be described below with corresponding features of the embodiment, which are mere examples, added in parentheses thereto.

In particular, a motion detection apparatus for detecting motion of an inputted image includes reference image storage means (for example, a reference image memory 14 shown in FIG. 1 and so forth) for storing the image as a reference image to be used as a reference for detection of motion, updating means (for example, an updating section 13 and a screen updating discrimination apparatus 26 shown in FIG. 1 and so forth) for periodically updating the reference image stored in the reference image storage means, current image storage means (for example, a current image memory 12 shown in FIG. 1 and so forth) for storing an image inputted now as a current image, motion detection means (for example, a brightness comparator 18, a color comparator 19, single point evaluation sections 20 and 21, an evaluation result memory 22 and a detection area discrimination section 23 shown in FIG. 1 and so forth) for comparing the current image stored in the current image storage means with the reference image stored in the reference image storage means and detecting motion of the image based on a result of the comparison, and extension means (for example, a dead zone processing section 24 shown in FIG. 1 and so forth) for extending an interval within which motion of the image is detected by the motion detection means by a predetermined extension time.

The motion detection apparatus further includes extension time setting means (for example, a display time setting apparatus 32 shown in FIG. 1 and so forth) for setting the predetermined extension time.

The motion detection apparatus includes updating periodical setting means (for example, a period setting apparatus 26A shown in FIG. 1 and so forth) for setting an updating period of the reference image by the updating means.

A motion detection apparatus for detection motion of an inputted image includes reference image storage means (for example, the reference image memory 14 shown in FIG. 1 and so forth) for storing the image as a reference image to be used as a reference for detection of motion, updating means (for example, the updating section 13 shown in FIG. 1 and so forth) for updating the reference image stored in the reference image storage means, current image storage means (for example, the current image memory 12 shown in FIG. 1 and so forth) for storing an image inputted now as a current image, motion detection means (for example, the brightness comparator 18, the color comparator 19, the single point evaluation sections 20 and 21, the evaluation result memory 22 and the detection area discrimination section 23 shown in FIG. 1 and so forth) for comparing the current image stored in the current image storage means with the reference image stored in the reference image storage means and detecting motion of the image based on a result of the comparison, and selection means (for example, the screen updating discrimination apparatus 26 shown in FIG. 1 and so forth) for selecting an updating method of the reference image by the updating means from among a plurality of methods.

A motion detection method for a motion detection apparatus which includes reference image storage means (for example, the reference image memory 14 shown in FIG. 1 and so forth) for storing an inputted image as a reference image to be used as a reference for detection of motion, updating means (for example, the updating section 13 shown in FIG. 1 and so forth) for updating the reference image stored in the reference image storage means, current image storage means (for example, the current image memory 12 shown in FIG. 1 and so forth) for storing an image inputted now as a current image, and motion detection means (for example, the brightness comparator 18, the color comparator 19, the single point evaluation sections 20 and 21, the evaluation result memory 22 and the detection area discrimination section 23 shown in FIG. 1 and so forth) for comparing the current image stored in the current image storage means with the reference image stored in the reference image storage means and detecting motion of the image based on a result of the comparison, is constructed such that an updating method of the reference image by the updating means is selectable from among a plurality of methods.

A motion detection apparatus for detection motion of an inputted image according to claim 10 includes reference image storage means (for example, the reference image memory 14 shown in FIG. 1 and so forth) for storing the image as a reference image to be used as a reference for detection of motion, current image storage means (for example, the current image memory 12 shown in FIG. 1 and so forth) for storing an image inputted now as a current image, brightness information comparison means (for example, the brightness comparator 18 shown in FIG. 1 and so forth) for comparing brightness information regarding brightness of the current image stored in the current image storage means and the reference image stored in the reference image storage means each other, color information comparison means (for example, the color comparator 19 shown in FIG. 1 and so forth) for comparing color information regarding colors of the current image stored in the current image storage means and the reference image stored in the reference image storage means each other, and motion detection means (for example, the brightness comparator 18, the color comparator 19, the single point evaluation sections 20 and 21, the evaluation result memory 22, the detection area discrimination section 23 and the dead zone processing section 24 shown in FIG. 1 and so forth) for detecting motion of the image based on results of the comparison by both of the brightness information comparison means and the color information comparison means.

The motion detection apparatus according to claim 13 further includes saturation detection means (for example, a hue/saturation conversion section 10 shown in FIG. 1 and so forth) for detection a saturation of each of pixels which form the reference image or the current image, and chromatic/achromatic color discrimination means (for example, an achromatic color discrimination section 11 shown in FIG. 1 and so forth) for discriminating based on the saturation detected by the saturation detection means whether the color of each of the pixels which form the reference image or the current image is a chromatic color or an achromatic color.

The motion detection apparatus according to claim 14 further includes updating means (for example, the updating section 13 and the screen updating discrimination apparatus 26 shown in FIG. 1 and so forth) for updating the reference image stored in the reference image storage means.

The motion detection apparatus according to claim 15 further includes imaging means (for example, a lens block 1, an exposure fixing apparatus 37, a driver 38 and a motor 39 shown in FIG. 1 and so forth) for imaging an imaging object and outputting an image signal corresponding to the image, and an exposure state of the image is fixed to a state for imaging of the reference image for a time until the reference image stored in the reference image storage means is updated by the updating means.

The motion detection apparatus according to claim 16 further includes motion detection range setting means (for example, a detection region setting apparatus 28 shown in FIG. 1 and so forth) for setting a range within which motion of the image is to be detected, and the motion detection means detects motion within the range set by the motion detection range setting means.

The motion detection apparatus further includes range selection means (for example, a combination setting apparatus 27 shown in FIG. 1 and so forth) for selecting, when a plurality of ranges are set by the motion detection range setting means, whether the plurality of ranges should be treated as independent ranges of each other or as a single range.

The motion detection apparatus further includes threshold value setting means (for example, a brightness threshold value setting apparatus 29 shown in FIG. 1 and so forth) for setting the predetermined threshold value.

The motion detection apparatus further includes threshold value setting means (for example, a hue threshold value setting apparatus 30 shown in FIG. 1 and so forth) for setting the predetermined threshold value.

The motion detection apparatus according to claim 26 further includes area setting means (for example, a detection size setting apparatus 31 shown in FIG. 1 and so forth) for setting the predetermined area.

The motion detection apparatus further includes display means (for example, a region display apparatus 35 shown in FIG. 1 and so forth) for displaying a result of the motion detection by the motion detection means in a superimposed state with the image.

The motion detection apparatus further includes outputting means (for example, a detection position outputting apparatus 36 shown in FIG. 1 and so forth) for outputting a result of the motion detection by the motion detection means to the outside.

It is to be noted that naturally the foregoing description does not signify that the individual means are limited to those described above.

FIG. 1 shows a construction of a video camera system (VCS) to which the present invention is applied. A lens block 1 is composed of a lens 2, an iris 3 and a charge coupled device (CCD) 4, and images light LA from an object to be imaged and outputs an image signal in the form of an electric signal. In particular, the light LA from the object is focused on the CCD 4 by the lens 2 to form an image. Consequently, an image signal corresponding to a received light amount then is outputted from the CCD 4.

The iris 3 is driven by a motor 39, which is energized to rotate by a driver 38, to adjust the amount of light to be received by the CCD 4 to a suitable value to place the exposure state of the lens block 1 into a suitable state. The iris 3, the driver 38 and the motor 39 thus form an automatic iris mechanism or automatic exposure adjustment apparatus.

The image signal outputted from the lens block 1 is sample-hold by a sample hold (S/H)/automatic gain control circuit (AGC) 5 and is then gain-controlled in response to an automatic iris control signal outputted from an exposure fixing apparatus 37 so that it may have a predetermined gain, whereafter it is outputted to an A/D converter 6.

The exposure fixing apparatus 37 not only controls the sample hold/automatic gain control circuit 5 but also stores an exposure state of the lens block 1 when a fetched image is stored as a reference image into a reference image memory 14 which will be hereinafter described and controls the driver 38 so that the exposure state of the lens block 1 may be fixed to the stored exposure state for a time till a time immediately before the reference image is updated (such control may be hereinafter referred to as exposure fixing control). Accordingly, in the lens block 1, when an image to be used as a reference image is fetched, an automatic exposure function operates, and thereafter, the exposure state when the reference image is fetched is maintained till a time immediately before the reference image is updated subsequently. In this instance, an error in detection of motion which may arise when the exposure state of the lens block 1 becomes different from the exposure state upon imaging of the reference image, for example, as a result of entering of a body as described above can be prevented.

A fetched image by the lens block 1 is stored as a reference image into the reference image memory 14 when detection of motion of an image is started and when an instruction to update a reference image is issued as hereinafter described. Start of detection of motion of an image is reported to the exposure fixing apparatus 37 by a detection start control apparatus 25 whereas an instruction to update a reference image is reported to the exposure fixing apparatus 37 by a screen updating discrimination apparatus 26.

The A/D converter 6 performs A/D conversion of an image signal in the form of an analog signal from the sample hold/automatic gain control circuit 5 in response to a predetermined clock signal to form a digital image signal. The image signal obtained as a digital signal by the A/D converter 6 is outputted to a brightness/color difference signal production circuit 7.

The brightness/color difference signal production circuit 7 produces, based on the image signal from the A/D converter 6, a brightness signal Y and color difference signals R-Y and B-Y of each of pixels which form a screen corresponding to the image signal and outputs them to an image primary storage apparatus 8.

The image primary storage apparatus 8 includes a pre-processing section 9, a hue/saturation conversion section 10, an achromatic color discrimination section 11, a current image memory 12, an updating section 13 and a reference image memory 14. The pre-processing section 9 performs necessary pre-processing such as sampling and so forth for the brightness signal Y and the color difference signals R-Y and B-Y from the brightness/color difference signal production circuit 7. The brightness signal Y and the color difference signals R-Y and B-Y for which such pre-processing has been performed by the pre-processing section 9 are outputted to the current image memory 12 and the hue/saturation conversion section 10, respectively.

The hue/saturation conversion section 10 converts the color difference signals R-Y and B-Y of each of the pixels of the fetched image from the pre-processing section 9 into a hue and a saturation and outputs them to the achromatic color discrimination section 11. The achromatic color discrimination section 11 discriminates, based on the saturation in color of each pixel from the hue/saturation conversion section 10, whether the color of the pixel is an achromatic color or a chromatic color. In particular, the achromatic color discrimination section 11 discriminates a color of a pixel as an achromatic color if, for example, the saturation in color of the pixel is lower than a predetermined threshold value, but discriminates another color of another pixel as a chromatic color if the saturation in color of the pixel is higher than the predetermined value. The achromatic color discrimination section 11 outputs, for each pixel discriminated to have a chromatic color, the hue from the hue/saturation conversion section 10 as it is, but outputs, for each pixel discriminated to have an achromatic color, this information, to the current image memory 12.

The current image memory 12 stores an image fetched or inputted now as a current image. In particular, the current image memory 12 stores a brightness, that is, brightness information, outputted from the pre-processing section 9 and a hue, that is, color information, which includes information that the color is an achromatic color, outputted from the achromatic color discrimination section 11. The current image memory 12 is divided into two regions into which a brightness and a hue are stored separately from each other. The current image memory 12 holds its stored contents until after one cycle of motion detection processing (motion detection processing in step S9 of a flow chart of FIG. 11 which will be hereinafter described) of a motion detection apparatus 15 which will be hereinafter described comes to an end. In other words, even if a new image is fetched, the current image memory 12 does not store (overwrite) the image until after one cycle of motion detection processing of the motion detection apparatus 15 is completed.

The brightness and the hue of each pixel stored in the current image memory 12 will be hereinafter represented suitably as Ynow and HUEnow, respectively.

The updating section 13 reads out the brightness Ynow and the hue HUEnow of each pixel stored in the current image memory 12 and transfers them to the reference image memory 14 which will be described below so that they may be stored into the reference image memory 14 to update the stored contents of the reference image memory 14. It is to be noted that the updating section 13 updates the stored contents of the reference image memory 14 with stored contents of the current image memory 12 in response to an instruction from the detection start control apparatus 25 or the screen updating discrimination apparatus 26.

The reference image memory 14 is constructed in a similar manner to the current image memory 12 and stores the brightness and the hue of each pixel stored in the current image memory 12 supplied from the updating section 13 as a reference image to be used as a reference for detection of motion. Here, the brightness and the hue of each pixel stored in the current image memory 12 will be hereinafter represented suitably as Yorg and HUEorg, respectively.

The motion detection apparatus 15 includes a pair of detection region read-out sections 16 and 17, a brightness comparator 18, a color comparator 19, a pair of single point evaluation sections 20 and 21, an evaluation result memory 22, a detection area discrimination section 23 and a dead zone processing section 24. The motion detection apparatus 15 compares a reference image stored in the reference image memory 14 and a current image stored in the current image memory 12 with each other and detects, based on a result of the comparison, a region of the current image in which motion is exhibited with respect the reference image, that is, detects motion of the current image.

In particular, the detection region read-out section 16 reads out from the current image memory 12 or the reference image memory 14 the brightness Ynow or Yorg of each of pixels which form a region (range) (hereinafter referred to suitably as detection region) for which detection of motion is to be performed, and outputs them to the brightness comparator 18. The detection region read-out section 17 reads out from the current image memory 12 or the reference image memory 14 the hue HUEnow or HUEorg of each of the pixels which form the detection region, and outputs them to the color comparator 19. The detection region can be set by manually operating the detection region setting apparatus 28, and the detection region read-out sections 16 and 17 perform reading out of data from the current image memory 12 and the reference image memory 14 corresponding to the detection region set in this manner.

The brightness comparator 18 compares the brightnesses Ynow and Yorg of corresponding ones of pixels of a current image and a reference image (pixels in a detection region) to detect those pixels which exhibit a variation in brightness, that is, to detect variations in brightness of the pixels. In particular, the brightness comparator 18 calculates, for example, an absolute value (hereinafter referred to suitably as brightness difference value) (|Ynow−Yorg|) of a difference value between the brightnesses Ynow and Yorg of each corresponding pixels and discriminates whether or not the brightness difference value is higher than a predetermined threshold value (hereinafter referred to suitably as brightness threshold value) for a brightness. Then, the brightness comparator 18 detects each pixel whose brightness difference value is higher than the brightness threshold value as a pixel which exhibits a variation in brightness. The brightness threshold value can be set by manually operating the brightness threshold value setting apparatus 29.

Also the color comparator 19 similarly compares the hues HUEnow and HUEorg of each corresponding ones of pixels of a current image and a reference image (pixels in a detection region) to detect those pixels which exhibit a variation in hue, that is, to detect variations in hue of the pixels. In particular, the color comparator 19 calculates, for example, an absolute value (hereinafter referred to suitably as color difference value) (|HUEnow−HUEorg|) of a difference value between the hues HUEnow and HUEorg of each corresponding pixels and discriminates whether or not the hue difference value is higher than a predetermined threshold value (hereinafter referred to suitably as hue threshold value) for a hue. Then, the color comparator 19 detects each pixel whose color difference value is higher than the color threshold value as a pixel which exhibits a variation in hue.

The color threshold value can be set by manually operating a hue threshold value setting apparatus 30.

While the hues HUEnow and HUEorg include information of whether or not the color of the pixel is an achromatic color as described hereinabove, the processing of calculating a color difference value and comparing it with the color threshold value is performed where both of the pixel of the current image (such pixel will be hereinafter referred to suitably as current image pixel) and the pixel of the reference image (such pixel will be hereinafter referred to suitably as reference image pixel) to be compared with each other have chromatic colors, but is not performed where only one of the current image pixel and the reference image pixel to be compared with each other has an achromatic color or where both of them have achromatic colors.

Where only one of the current image pixel and the reference image pixel has an achromatic color and accordingly the other pixel has a chromatic color, the color comparator 19 detects that the pixel exhibits a variation in hue. On the other hand, where both of the current image pixel and the reference image pixel have achromatic colors, the color comparator 19 does not perform detection for the pixel, or in other words, the pixel is treated as a pixel which does not exhibit a variation in hue.

Each pixel whose variation in brightness or hue has been detected by the brightness comparator 18 or the color comparator 19 is outputted to the single point evaluation section 20 or 21. The single point evaluation section 20 discriminates whether or not each pixel whose variation in brightness has been detected by the brightness comparator 18 is isolated, and performs, where the pixel is isolated, isolated point removal processing to change the pixel so that it does not exhibit a variation in brightness. In particular, the single point evaluation section 20 discriminates whether or not a variation has been detected from pixels around the pixel from which a variation in brightness has been detected by the brightness comparator 18, and changes the pixel from which a variation has been detected so that it does not exhibit any variation. Further, the single point evaluation section 20 writes, for example, "1" into an address of the evaluation result memory 22 corresponding to each pixel which exhibits a variation in brightness (such pixel will be hereinafter referred to suitably as brightness variation point), obtained as a result of the isolated point removal processing.

The single point evaluation section 21 performs such isolated point removal processing as described above for those pixels from which a variation in hue has been detected by the brightness comparator 18 and writes, for example, "1" into addresses of the evaluation result memory 22 corresponding to those elements obtained as a result of the isolated point removal processing and having hues which exhibit a variation.

The evaluation result memory 22 has, for example, a frame memory construction, and "1" is written into addresses of the evaluation result memory 22 corresponding to brightness variation points and hue variation points by the single point evaluation sections 20 and 21, respectively. The stored contents of the evaluation result memory 22 are initialized, for example, to "0" immediately before reading out of data from the current image memory 12 or the reference image memory 14 by the detection region read-out section 16 or 17 is started. Accordingly, "1" is stored into an address of the evaluation result memory 22 which corresponds to each of at least ones of brightness variation points and hue variation points of pixels in a detection region, and "0" is stored in the other addresses of the evaluation result memory 22.

The detection area discrimination section 23 refers to the evaluation result memory 22 to count the number of those pixels forming a detection region which make brightness variation points or hue variation points, and compares the count value with a predetermined value (hereinafter referred to suitably as detection size). Only when the count value is higher than the detection size, the detection area discrimination section 23 discriminates a region which is formed from such brightness variation points and hue variation points as a region in which motion has occurred, and outputs the region to the dead zone processing section 24. In particular, when the area of the region formed from the brightness variation points and the hue variation points in the detection region is larger than the area corresponding to the detection size, the detection area discrimination section 23 determines that motion has occurred in the region (such region will be hereinafter referred to as motion detection region) and outputs the motion detection region to the dead zone processing section 24. It is to be noted that the detection size can be set by manually operating the detection size setting apparatus 31.

The dead zone processing section 24 outputs, when the motion detection region is received from the detection area discrimination section 23, the motion detection region to the screen updating discrimination apparatus 26 and an output change-over apparatus 34 to report to them that motion of an image has been detected. Further, in this instance, the dead zone processing section 24 also performs such dead zone processing and display time extension processing or output time extension processing as hereinafter described. It is to be noted that the period of a dead zone or the display extension time which is required for the dead zone processing or the display time extension processing can be set by manually operating a dead zone time setting apparatus 33 or the display time setting apparatus 32.

The detection start control apparatus 25 is manually operated to start detection of motion of an image formed by the lens block 1 or to end detection of motion after such detection is started. When the detection start control apparatus 25 is manually operated, an instruction to start or end detection of motion of an image is outputted to the updating section 13, the output change-over apparatus 34 and the exposure fixing apparatus 37.

As described above, when the instruction to start detection of motion (such instruction will be hereinafter referred to suitably as motion detection start instruction) is received from the detection start control apparatus 25, the updating section 13 updates stored contents of the reference image memory 14 with stored contents of the current image memory 12. Then, when the instruction to end detection of movement (such instruction will be hereinafter referred to suitably as motion detection end instruction) is received, the updating section 13 stops updating of stored contents of the reference image memory 14.

The output change-over apparatus 34 selects the output of the dead zone processing section 24 when the motion detection start instruction is received, but selects the output of the detection region setting apparatus 28 when the motion detection end instruction is received. The output change-over apparatus 34 outputs the selected output to the region display apparatus 35 and the detection position outputting apparatus 36.

The exposure fixing apparatus 37 starts, when the motion detection start instruction is received, such exposure fixing control as described hereinabove, but stops the exposure fixing control when the motion detection end instruction is received.

The screen updating discrimination apparatus 26 outputs an instruction to the updating section 13 to update stored contents of the reference image memory 14. Further, the screen updating discrimination apparatus 26 outputs an instruction (hereinafter referred to suitably as updating instruction) to update stored contents of the reference image memory 14 also to the exposure fixing apparatus 37. The exposure fixing apparatus 37 performs, after the motion detection start instruction is received, such exposure fixing control as described above in response to the updating instruction.

For a method of updating stored contents of the reference image memory 14 in response to an updating instruction from the screen updating discrimination apparatus 26, for example, three modes including an unconditional updating mode, a conditional mode and an updating inhibition mode are prepared in the present embodiment. It can be set by manually operating the screen updating discrimination apparatus 26 in which mode updating should be performed.

In the unconditional updating mode, stored contents of the reference image memory 14 are periodically updated with stored contents of the current image memory 12. Where stored contents of the reference image memory 14 are not updated conversely, even when, for example, the weather or the sunlight varies gradually, if a long time passes, then the current image stored in the current image memory 12 becomes different from the reference image stored in the reference image memory 14, and consequently, the variation is detected as motion of the image. In the unconditional updating mode, however, since the reference image is periodically updated, it can be prevented that such variation is detected as motion of an image.

In the conditional updating mode, when the information representing that motion of an image has been detected is not received from the dead zone processing section 24, stored contents of the reference image memory 14 are periodically updated with stored contents of the current image memory 12. However, while the information representing that motion of an image has been detected is received from the dead zone processing section 24, updating of the reference image memory 14 is inhibited.

In the unconditional updating mode described above, since the reference image stored in the reference image memory 14 is normally periodically updated, for example, if someone enters a room, displaces something in the room and then goes out of the room, motion of an image is detected when someone enters and displaces something, but motion of an image is not detected any more after the reference image is updated after the person goes out of the room.

In contrast, in the conditional updating mode, while motion is detected, updating of the reference image is inhibited. Consequently, also after the entering person goes out of the room, the image obtained when the person enters the room remains as the reference image. As a result, the state when motion of an image is detected is maintained thereafter.

In the updating inhibition mode, updating of the reference image is inhibited. Consequently, the image stored into the reference image memory 14 when the detection start control apparatus 25 is manually operated to start detection of motion of an image remains as the reference image. The updating inhibition mode is set, for example, when motion of a object to be imaged which is, for example, illuminated with a fixed illumination or when the time within which motion of an image is to be detected is short (in such a case, motion can be detected with a high degree of accuracy by using the updating inhibition mode).

It is to be noted that, when updating of the reference image is inhibited in the conditional updating mode or when the updating inhibition mode is set, updating of the reference image can be performed by manually operating the screen updating discrimination apparatus 26. Further, the period in which the reference image is updated where the unconditional updating mode or the conditional updating mode is set can be set by manually operating a period setting apparatus 26A provided for the screen updating discrimination apparatus 26. Furthermore, the screen updating discrimination apparatus 26 includes an updating counter 26B. When periodical updating of the reference image is to be performed, the screen updating discrimination apparatus 26 repeats such processing that, for example, the updating counter 26B counts predetermined clocks and, when the count value reaches a predetermined value, the screen updating discrimination apparatus 26 outputs an updating instruction and then resets the count value to 0. Accordingly, a value to which the updating counter 26B is to be reset is set by manually operating the period setting apparatus 26A).

The combination setting apparatus 27 is manually operated to select, when a plurality of detection regions are set by manual operation of the detection region setting apparatus 28 which will be described below, whether the plurality of detection regions should be treated as independent regions or ranges of each other or treated as a single region. When the combination setting apparatus 27 is set to a mode (hereinafter referred to suitably as an independent mode) in which the plurality of detection regions are treated as independent regions, the motion detection apparatus 15 performs processing for the individual detection regions. On the other hand, when the combination setting apparatus 27 is set to another mode (hereinafter referred to suitably as combination mode) in which the plurality of detection regions are treated as a single region, the motion detection apparatus 15 performs processing regarding the detection regions as a single detection region. Each detection region which can be set by the detection region setting apparatus 28 is, in the present embodiment, for example, a rectangular range including a square range. Accordingly, a detection region of a complicated shape can be set by combination of a plurality of rectangular detection regions by means of the combination setting apparatus 27.

It is to be noted that regions which are regarded as a single region where the combination mode is set are, in the present embodiment, those detection regions which, for example, are contiguous to each other or overlap each other.

The detection region setting apparatus 28 is manually operated to set a detection region from which motion of an image is to be detected. It is to be noted that, as described hereinabove, a plurality of detection regions can be set. The brightness threshold value setting apparatus 29 is manually operated to set a brightness threshold value. The hue threshold value setting apparatus 30 is manually operated to set a hue threshold value.

The detection size setting apparatus 31 is manually operated to set a detection size. The detection size may be set with a number of pixels described hereinabove or set in such a form as, for example, a percentage of a detection region. Further, where it is set by the combination setting apparatus 27 that a plurality of detection regions are to be treated as a single detection region (a plurality of detection regions to be handled as a single detection region will be hereinafter referred to suitably as combination detection region), the detection area discrimination section 23 performs processing not for individual ones of a plurality of detection regions but for the entire combination detection region (details of this will be hereinafter described).

The display time setting apparatus 32 is manually operated to set a display extension time which will be hereinafter described. The dead zone time setting apparatus 33 is manually operated to set a dead zone which will be hereinafter described.

Since the user interfaces for setting various parameters necessary for detection of motion are provided as described above, optimum detection of motion can be performed under any condition.

The output change-over apparatus 34 selects, before reception of a motion detection start instruction and after reception of a motion detection end instruction, a detection region set by manual operation of the detection region setting apparatus 28, but selects, for a time after a motion detection start instruction is received until a motion detection end signal is received, the output of the dead zone processing section 24, and supplies the detection region or the output thus selected to the region display apparatus 35 and the detection position outputting apparatus 36. Accordingly, while detection processing for motion of an image is not proceeding, a detection region outputted from the detection region setting apparatus 28 is supplied, but while motion detection processing for an image is proceeding, a result of motion detection outputted from the dead zone processing section 24 is supplied, to the region display apparatus 35 and the detection position outputting apparatus 36.

The region display apparatus 35 is formed from a display unit such as, for example, a CRT or an LCD and displays the output of the output change-over apparatus 34. The detection position outputting apparatus 36 is formed from, for example, a modem or some other communication apparatus, and transmits the output of the output change-over apparatus 34 by, for example, serial communication over a predetermined transmission line.

It is to be noted that, though not shown, also an image signal outputted from the A/D converter 6 is supplied to the region display apparatus 35 and the detection position outputting apparatus 36. Consequently, also an image formed by the lens block 1 is displayed on the region display apparatus 35 and transmitted from the detection position outputting apparatus 36.

When detection of motion is not proceeding with the motion detection apparatus 15, the region display apparatus 35 displays a detection region supplied from the detection region setting apparatus 28 via the output change-over apparatus 34, for example, in a superimposed relationship with the image formed by the lens block 1. Accordingly, the user will manually operate the detection region setting apparatus 28 to set a detection region while observing the display screen of the region display apparatus 35.

On the other hand, when detection of motion is proceeding with the motion detection apparatus 15, the region display apparatus 35 displays a region, from which motion has been detected, supplied from the detection region setting apparatus 28 via the output change-over apparatus 34, for example, in a superimposed relationship with the image formed by the lens block 1.

It is to be noted that it can be set by manually operating the region display apparatus 35 whether a detection region or a region from which motion has been detected should be superimposed. Further, the region display apparatus 35 can display only a detection region or a region from which motion has been detected.

Subsequently, setting of a detection region by manual operation of the detection region setting apparatus 28 will be described with reference to FIGS. 2A to 2C. It is to be noted that, in FIGS. 2A to 2C, a rectangular region delineated by a thick line represents a detection region.

Figure 2B:
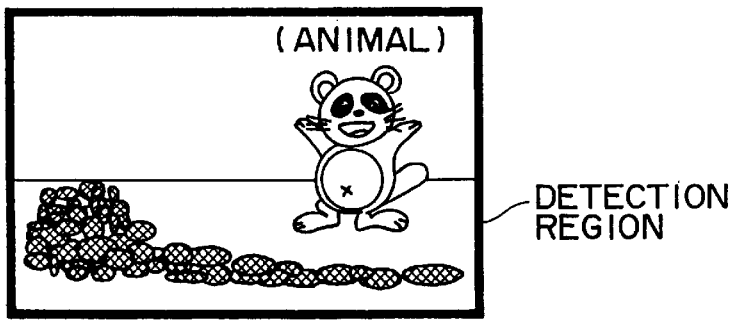
Figure 2C:
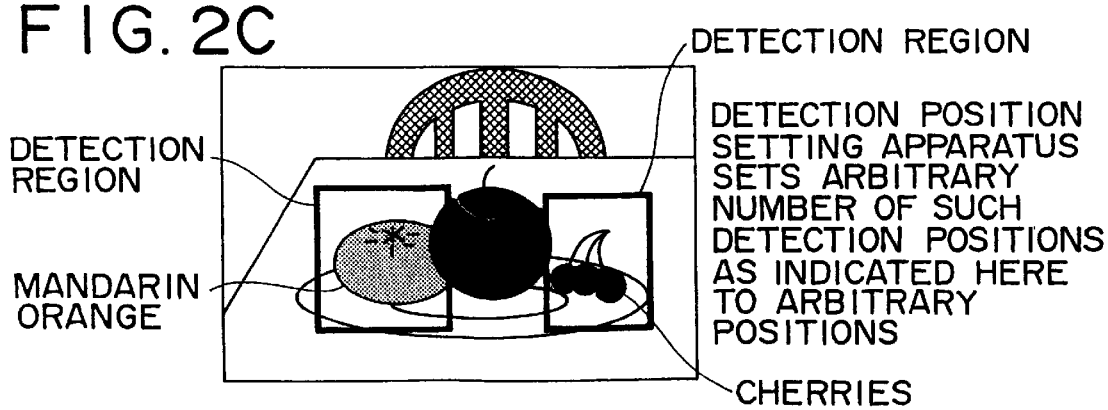
Figures 3A, 3B, 3C, 3D:
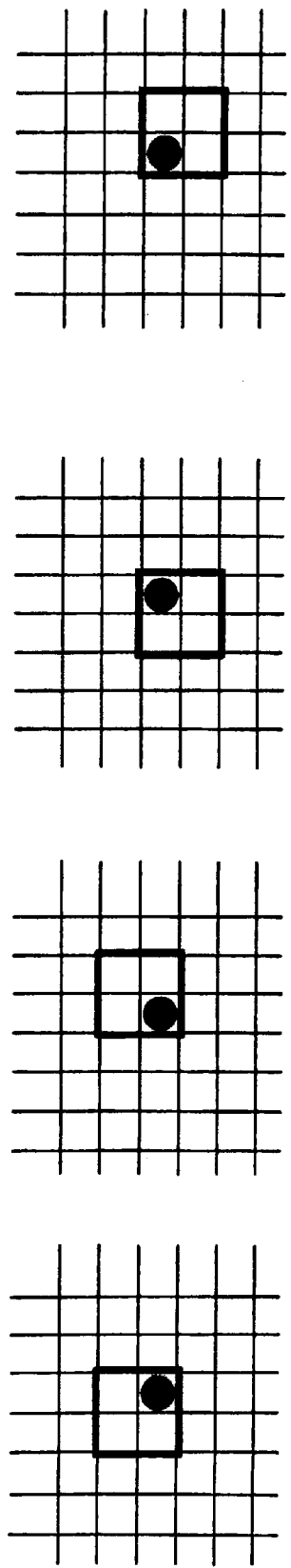
FIGS. 3A to 3D are diagrammatic views showing square regions of 2×2 pixels to be inspected by a single point evaluation section shown in FIG. 1.

FIG. 2A shows a manner in which that range of an image formed by the lens block 1 which includes a door is set as a detection region. Where the detection region is set in this manner, motion only of the portion of the screen which includes the door is detected by the motion detection apparatus 15. FIG. 2B shows a manner in which an entire image formed by the lens block 1 is set as the detection region. In this instance, motion of the entire image is detected by the motion detection apparatus 15. FIG. 2C shows a manner in which, from within an image formed by the lens block 1, a range including a mandarin orange and another range including cherries are set as detection regions. Not only one but also a plurality of detection regions can be set in this manner.

Subsequently, details of the isolated point removal processing of the single point evaluation section 20 will be described with reference to FIGS. 3A to 3D and 4A and 4B. The single point evaluation section 20 discriminates whether all pixels included in a square range of, for example, 2×2 pixels (such range will be hereinafter referred to suitably as isolated point discrimination range) including a pixel from which a variation in brightness has been detected by the brightness comparator 18 exhibit a variation in brightness. In other words, the single point evaluation section 20 refers to such four isolated point discrimination ranges (ranges delineated by thick lines in FIGS. 3A to 3D) including the pixel (pixel indicated by ● in FIGS. 3A to 3D) which exhibits a variation in brightness as shown in FIGS. 3A to 3D to discriminate whether any of the four isolated point discrimination ranges is full of pixels which exhibit a variation in brightness. Then, if none of the isolated point discrimination ranges is full of pixels which exhibit a variation in brightness, the single point evaluation section 20 determines the pixel which exhibits a variation in brightness as an isolated point and thereafter treats it as a pixel which exhibits no variation in brightness. On the other hand, where any of the isolated point discrimination ranges is full of pixels which exhibit a variation in brightness, the single point evaluation section 20 determines the pixel which exhibits a variation in brightness as a brightness variation point and writes "1" into an address of the evaluation result memory 22 corresponding to the pixel.

Figure 4A:
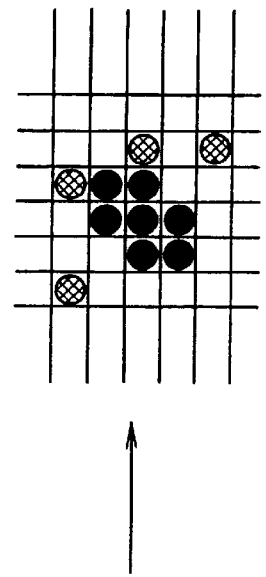
FIGS. 4A and 4B are similar views but illustrating isolated point removal processing of the single point evaluation sections of FIG. 1.
Figure 4B:
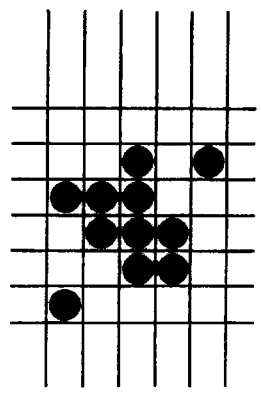

Accordingly, for example, when such pixels which exhibit a variation in brightness as indicated by ● marks in FIG. 4A are detected by the brightness comparator 18, "1" is written into positions indicated by the ● marks in FIG. 4B in the evaluation result memory 22.

Also the single point evaluation section 21 performs similarly processing for pixels which exhibit a variation in hue.

An isolated point is detected with a high degree of possibility as a point whose brightness or hue is varied, for example, by noise. Accordingly, by such isolated point processing as described above, erroneous detection of motion by such noise can be prevented.

It is to be noted that, while, in the embodiment of FIG. 1, a pixel which exhibits a variation in brightness and a pixel which exhibits a variation in hue are subject separately and independently of each other as an object of processing to isolated point removal processing, it is otherwise possible to perform the isolated point removal processing for each pixel which exhibits a variation at least in brightness or hue, that is, to perform the isolated point removal processing irrespective of which one of brightness and hue of the pixel exhibits a variation.

Subsequently, stored contents of the evaluation result memory 22 will be described with reference to FIGS. 5A to 5C. As described above, the single point evaluation section 20 or 21 performs isolated point removal processing for pixels which exhibit a variation in brightness or hue and writes "1" into those addresses of the evaluation result memory 22 which correspond to brightness variation points or hue variation points obtained as a result of the isolated point removal processing.

Figure 5A:
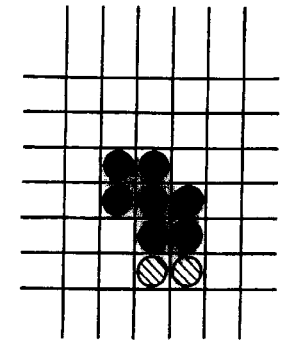
FIGS. 5A to 5C are diagrammatic views illustrating stored contents of an evaluation result memory shown in FIG. 1.
Figure 5B:
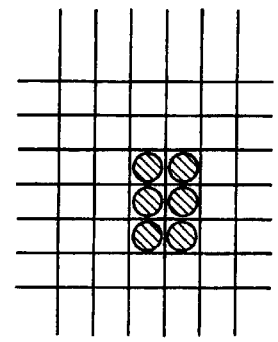
Figure 5C:
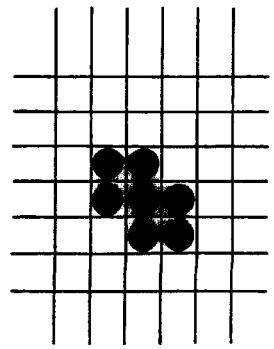

Accordingly, for example, if such seven brightness variation points as indicated by ● marks in FIG. 5A are obtained by the single point evaluation section 20 and such six hue variation points as indicated by ○ marks with slanting lines applied thereto in FIG. 5B are obtained by the single point evaluation section 21, the stored contents of the evaluation result memory 22 are such as shown in FIG. 5C. In particular, "1" is placed in the address of each pixel which corresponds to at least one of a brightness variation point and a hue variation point. Consequently, while, in the example illustrated in FIGS. 5A to 5C, seven brightness variation points and six hue variation points are involved, the value "1" is stored in nine addresses of the evaluation result memory 22.

Now, if a pixel which is at least one of a brightness variation point and a hue variation point is called merely as variation point, the detection area discrimination section 23 compares the number of such variation points with a detection size. Then, only when the number is larger than the detection size, the detection area discrimination section 23 determines the region formed from the variation points as a region in which motion has occurred, that is, as a motion detection region, and outputs it to the dead zone processing section 24.

Figure 6A:
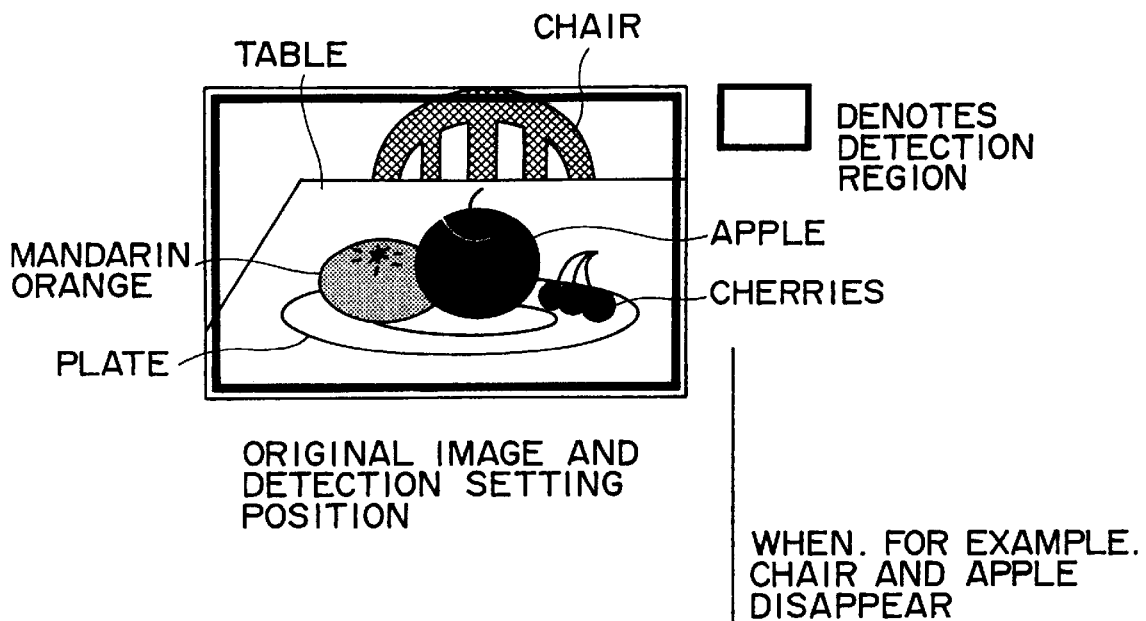
FIGS. 6A and 6B are schematic views illustrating motion detection processing of a motion detection apparatus shown in FIG. 1.
Figure 6B:
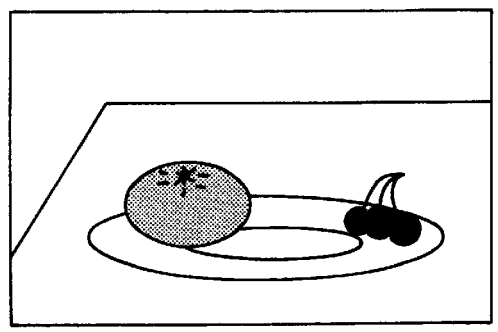

Subsequently, processing of the motion detection apparatus 15 when, for example, where the reference image stored in the reference image memory 14 is such as shown in FIG. 6A, the current image stored in the current image memory 12 is different from the reference image in that a chair and an apple have disappeared as shown in FIG. 6B will be described simply with reference to FIGS. 7A to 7E. It is to be noted that the detection region is set to an entire image formed by the lens block 1. Further, it is assumed that the colors of the apple and a mandarin orange are, for example, red and orange, respectively.

In this instance, pixels which exhibit a variation in brightness are detected, for example, as shown in FIG. 7A by the brightness comparator 18 while pixels which exhibit a variation in hue are detected, for example, as shown in FIG. 7B by the color comparator 19. It is to be noted that, in FIGS. 7A to 7D, each pixel which exhibits a variation in brightness is indicated by "1", and each pixel which exhibits a variation in hue is indicated by "2".

Thereafter, for a result of detection of pixels which exhibit a variation in brightness or hue shown in FIG. 7A or 7B, isolated point removal processing is performed by the single point evaluation section 20 or 21. Consequently, each pixel whose brightness or hue has been varied by an influence of noise or the like is removed, and such brightness variation points ("1") or hue variation points ("2") as shown in FIG. 7C or 7D are detected. Then, those pixels detected as brightness variation points ("1") or/and hue variation points ("2") are stored in the evaluation result memory 22 as shown in FIG. 7E. It is to be noted that, in FIG. 7E, pixels which exhibit a variation only in brightness are indicated by "1"; pixels which exhibit a variation only in hue are indicated by "2"; and pixels which exhibit a variation in both of brightness and hue are indicated by "3".

Accordingly, in this instance, a region formed from pixels to which any of "1", "2" and "3" is applied in FIG. 7E (or a region delineated by a thick line in FIG. 7E) is detected as a region in which motion has occurred, that is, a motion detection region.

As can be seen from comparison between FIG. 7A (or FIG. 7C) and FIG. 7B (or FIG. 7D), since locations of a region hidden behind an apple which correspond to a table and a dish exhibit a variation in both of brightness and hue, from those locations, a variation is detected in regard to both of brightness and hue.

On the other hand, a location of a mandarin orange in the region hidden behind the apple exhibits little variation in brightness even if the apple disappears, and consequently, a variation in brightness is not detected from the location (FIGS. 7A and 7C). Accordingly, it is difficult to detect motion in such location if a variation only in brightness is detected. However, since the video camera system of FIG. 1 detects not only a variation in brightness but also a variation in hue, if the apple of the red color disappears and the mandarin orange of the orange color appears, then a variation in hue at the location is detected (FIGS. 7B and 7D). Accordingly, in this instance, the region in which the apple has been present can be detected accurately.

In other words, it sometimes occurs that, even if an image exhibits some motion, the brightness does not exhibit a variation, but only the hue exhibits a variation. Accordingly, motion of an image can be detected accurately by detecting not only a variation in brightness but also a variation in hue. Further, in this instance, since there is no need of raising the detection sensitivity for detection of a variation very much, also erroneous detection which may arise from such raising of the detection sensitivity can be prevented.

Subsequently, dead zone processing by the dead zone processing section 24 will be described with reference to FIGS. 8A and 8B. It is assumed now that a region in which motion has occurred, that is, a motion detection region, is outputted from the detection area discrimination section 23 as shown in FIG. 8A. It is to be noted that, in FIGS. 8A and 8B (the following similarly applies to FIGS. 9A to 9C and 10A to 10C), an interval in which a motion detection region is outputted from the detection area discrimination section 23 is represented as variation detection interval.

While, in FIG. 8A, a comparatively long variation detection interval (1) and a variation detection interval (2) of a short time are shown, a variation detection interval of a short time like the variation detection section (2) of them is considered to be produced by an influence of, for example, noise. Accordingly, motion which is detected only within such a short time should not be outputted. Therefore, the dead zone processing section 24 is constructed such that, even if outputting of a motion detection region from the detection area discrimination section 23 is started, this is not outputted immediately, but the motion detection region from the detection area discrimination section 23 is outputted only when, after a predetermined time (first interval) T1 elapses after outputting of the motion detection region from the detection area discrimination section 23 is started, the outputting still continues as shown in FIG. 8B.

Further, it sometimes occurs that outputting of a motion detection region from the detection area discrimination section 23 is stopped for a short period by an influence of, for example, noise. Therefore, even if it becomes impossible to receive a motion detection region from the detection area discrimination section 23 after the dead zone processing section 24 starts outputting of a motion detection region from the detection area discrimination section 23, the dead zone processing section 24 does not stop such outputting immediately, but stops the outputting of a motion detection region only when stopping of the outputting continues after a predetermined time (second interval) T2 elapses after the outputting of a motion detection region from the detection area discrimination section 23 is stopped as shown in FIG. 8B.

By performing such dead zone processing as described above, it can be prevented that outputting of a motion detection region from the motion detection apparatus 15 is performed or stopped only for an instant when motion occurs for a very short period of time like the variation detection interval (2) or when motion stops for a very short time while the motion is proceeding.

The predetermined intervals (dead periods) T1 and T2 can be set by manually operating the dead zone time setting apparatus 33 as described hereinabove. Further, the intervals T1 and T2 may be set to equal or different values.

Subsequently, the display time extension processing of the dead zone processing section 24 will be described with reference to FIGS. 9A to 9C and 10A to 10C. It is assumed that an object being imaged by the lens block 1 starts to move at time t2 and then stops immediately. Further, it is assumed that the unconditional updating mode is set by the screen updating discrimination apparatus 26, and consequently, the reference image is updated, for example, at a timing of the rising edge of a pulse of a predetermined period shown in FIG. 9B.

In this instance, since the reference image is updated at time t1 prior to time t2 as shown in FIG. 9B, motion of the object to be imaged which has started to move and then stopped immediately is detected at time t2. Thereafter, motion of the object to be imaged continues to be detected until the reference image is updated. Then, after the reference image is updated at time t4, since the reference image after the updating and the current image are now identical with each other, motion of the object to be imaged is not detected any more.

Accordingly, from the evaluation result memory 22, a motion detection region over the interval from time t2 to time t4 as shown in FIG. 9A is outputted to the dead zone processing section 24.

In this instance, as shown in FIG. 9C, the dead zone processing section 24 starts, as a result of dead zone processing, outputting of a motion detection region from the evaluation result memory 22 when time t3 comes after the predetermined interval T1 elapses after time t2, and then when time t5 comes after the predetermined time T2 elapses after time t4, the outputting is stopped. Although the motion detection region outputted from the dead zone processing section 24 is displayed on the region display apparatus 35 as described hereinabove, when the time from time t3 to time t5 is short, the motion detection region is detected only for a moment, and it sometimes occurs that motion is missed or it cannot be confirmed at which portion the motion has occurred.

Thus, the dead zone processing section 24 continues to output a motion detection region for a predetermined display extension time T3 (shadowed portion in FIG. 9C) also after lapse of time t5 as shown in FIG. 9C, or in other words, extends the interval within which motion is detected. Accordingly, the dead zone processing section 24 starts outputting of a motion detection region from time t3 and thereafter continues its outputting till time t6 after the predetermined display extension time T3 elapses after time t5.

It is to be noted that while, in FIG. 9A, motion is detected also within an interval from time t7 to time t8, since this interval is shorter than the predetermined time T1, a motion detection region is not outputted from the dead zone processing section 24 as a result of the dead zone processing described with reference to FIGS. 8A and 8B.

Such display time extension processing as described above is useful not only for a case wherein an object to be imaged moves only for a moment as described above but also for another case wherein the object to be imaged continues to move. In particular, when an object to be imaged continues to move, if updating of the reference image is periodically performed as shown in FIG. 10B similar to FIG. 9B, then motion of the object to be imaged is not detected at such updating timings t14, t18, t22 and t26 since the reference image after each such updating and the current image are identical with each other.

Further, in this instance, while the object to be imaged continues to move, if the motion does not have some magnitude, a pixel which exhibits a variation is not detected, for example, by the brightness comparator 18 or the color comparator 19. Accordingly, some interval of time is required before motion of the object to be imaged is detected after the reference image is updated consequently, even if the object to be imaged continues to move, periods for which a motion detection region is detected, that is, variation detection intervals, appear intermittently as shown by blank portions in FIG. 10C. As a result, the display of a motion detection region on the region display apparatus 35 becomes flickering.

Thus, such flickering of the display as described above can be prevented by the dead zone processing section 24 performing display time extension processing to extend outputting of a motion detection region as indicated by shadows in FIG. 10C. It is to be noted that, if a region in which new motion has occurred is supplied from the detection area discrimination section 23 before the display extension time T3 elapses after outputting of a motion detection region is extended, the dead zone processing section 24 stops the extension after lapse of the predetermined time T1 for dead zone processing and thereafter starts outputting of the region in which new motion has occurred.

Subsequently, operation of the video camera system of FIG. 1 will be described with reference to a flow chart of FIG. 11. The video camera system starts imaging of an object to be imaged when the power supply to the apparatus is turned on. In particular, light LA from the object to be imaged is converted into an image signal by photoelectric conversion of the lens block 1. The image signal is processed by the sample hold/automatic gain control circuit 5, the A/D converter 6, the brightness/color difference signal production circuit 7 and the pre-processing section 9 so that it is converted into and outputted as a brightness signal Y and color difference signals R-Y and B-Y.

The brightness signal Y is supplied and stored as a brightness Ynow to and into the current image memory 12 while the color difference signals R-Y and B-Y are converted by the hue/saturation conversion section 10 and the achromatic color discrimination section 11 into a hue HUEnow, which also is stored into the current image memory 12. Meanwhile, the image signal outputted from the lens block 1 is supplied also to and displayed by the region display apparatus 35. Thereafter, similar processing is repeated until the detection start control apparatus 25 is manually operated to start detection of motion. It is to be noted that the automatic exposure control of the lens block 1 operates while such processing is repeated.

Then, in step S1, it is discriminated whether or not the detection start control apparatus 25 is manually operated to start detection of motion. When it is discriminated that the detection start control apparatus 25 is not manually operated to start detection of motion, the control sequence advances to step S2, in which setting of a detection region by manual operation of the detection region setting apparatus 28 or setting of the independent mode or the combination mode by manual operation of the combination setting apparatus 27 is performed. Further in step S2, also setting of the updating mode for a reference image, an updating period for a reference image, a brightness threshold value, a hue threshold value, a detection size, a display extension time T3 or dead times T1 and T2 is performed by manual operation of the screen updating discrimination apparatus 26, period setting apparatus 26A, brightness threshold value setting apparatus 29, hue threshold value setting apparatus 30, detection size setting apparatus 31, display time setting apparatus 32 or dead zone time setting apparatus 33.

Thereafter, in step S3, the updating counter 26B is cleared (the count value of the updating counter 26B is reset to 0), whereafter the control sequence advances to step S4, in which the detection region set by the detection region setting apparatus 28 is supplied to the region display apparatus 35 via the output change-over apparatus 34 so that it is displayed in a superimposed relationship with the image formed by the lens block 1. Further, the detection region is supplied also to the detection position outputting apparatus 36 so that it is transmitted via the transmission line. Also the information representing that motion of an image has not been detected is transmitted from the detection position outputting apparatus 36 via the transmission line. Here, the information transmitted from the detection position outputting apparatus 36 in this manner is received at a remote location and displayed on a display unit or the like.

On the other hand, when it is discriminated in step S1 that the detection start control apparatus 25 is manually operated to start detection of motion, exposure fixing control is started by the exposure fixing apparatus 37. Then, the control sequence advances to step S5, in which it is discriminated whether or not the discrimination processing in this step S5 is performed for the first time after it was discriminated in step S1 that the detection start control apparatus 25 is manually operated to start detection of motion. If it is discriminated in step S5 that the discrimination processing in this step S5 is performed for the first time, or in other words, if no reference image is stored in the reference image memory 14, the control sequence advances to step S6. In step S6, the superimposed display is erased from the region display apparatus 35 and information representing that motion of an image has not been detected is transmitted via the transmission line from the detection position outputting apparatus 36.

Thereafter, in step S7, the updating counter 26B is cleared, and then the control sequence advances to step S8, in which updating of the reference image is performed. In particular, the current image (Ynow and HUEnow) stored in the current image memory 12 is transferred to the reference image memory 14 by the updating section 13, and consequently, the current image stored in the current image memory 12 now is stored as a reference image (Yorg and HUEorg) into the reference image memory 14.

After the processing in step S8, the control sequence returns to step S1. However, since the detection start control apparatus 25 has been manually operated already to start detection of motion, the control sequence advances to step S5. Then, in step S5, it is discriminated that the discrimination processing in this step S5 is not performed for the first time after it was discriminated in step S1 that the detection start control apparatus 25 was manually operated to start detection of motion. In this instance, the control sequence advances to step S9, in which motion detection processing is performed by the motion detection apparatus 15 for the image fetched by the lens block 1, and accordingly, for the current image stored in the current image memory 12. It is to be noted that this motion detection processing will be hereinafter described with reference to FIG. 12.

After the motion detection processing is performed in step S9, the control sequence advances to step S10, in which it is discriminated whether motion has been detected in step S9. If it is discriminated in step S10 that motion has been detected, then the control sequence advances to step S11, in which a motion detection region outputted from the dead zone processing section 24 is supplied to the region display apparatus 35 and the detection position outputting apparatus 36 via the output change-over apparatus 34, whereafter the control sequence advances to step S13. Accordingly, in this instance, the motion detection region is displayed on the region display apparatus 35. Further, the motion detection region is transmitted from the detection position outputting apparatus 36 via the transmission line. Furthermore, also the information representing that motion has been detected is transmitted from the detection position outputting apparatus 36.

On the other hand, when it is detected in step S10 that motion has not been detected, the control sequence advances to step S12, in which similar processing to that in step S6 is performed, whereafter the control sequence advances to step S13. In step S13, processing corresponding to the updating mode set by manual operation of the screen updating discrimination apparatus 26 is performed. In particular, where the unconditional updating mode is set, the count value of the updating counter 26B is incremented by one in step S13. However, when the conditional updating mode is set, the updating counter 26B is cleared in step S13 if it has been discriminated in step S9 that motion has been detected, but if it has been discriminated in step S9 that motion has not been detected, the count value of the updating counter 26B is incremented by one in step S13. Further, where the updating inhibition mode is set, the updating counter 26B is cleared in step S13.

Thereafter, the control sequence advances to step S14, in which it is discriminated whether or not the count value of the updating counter 26B is larger than the value set by manual operation of the screen updating discrimination apparatus 26. When it is discriminated in step S14 that the count value of the updating counter 26B is not larger than the value set by manual operation of the screen updating discrimination apparatus 26, the control sequence returns to step S1. On the other hand, if it is discriminated in step S14 that the count value of the updating counter 26B is larger than the value set by manual operation of the screen updating discrimination apparatus 26, the control sequence advances successively to steps S7 and S8, in which the updating counter 26B is cleared and updating of the reference image is performed, respectively, as described above, whereafter the control sequence returns to step S1.

Figure 12B:
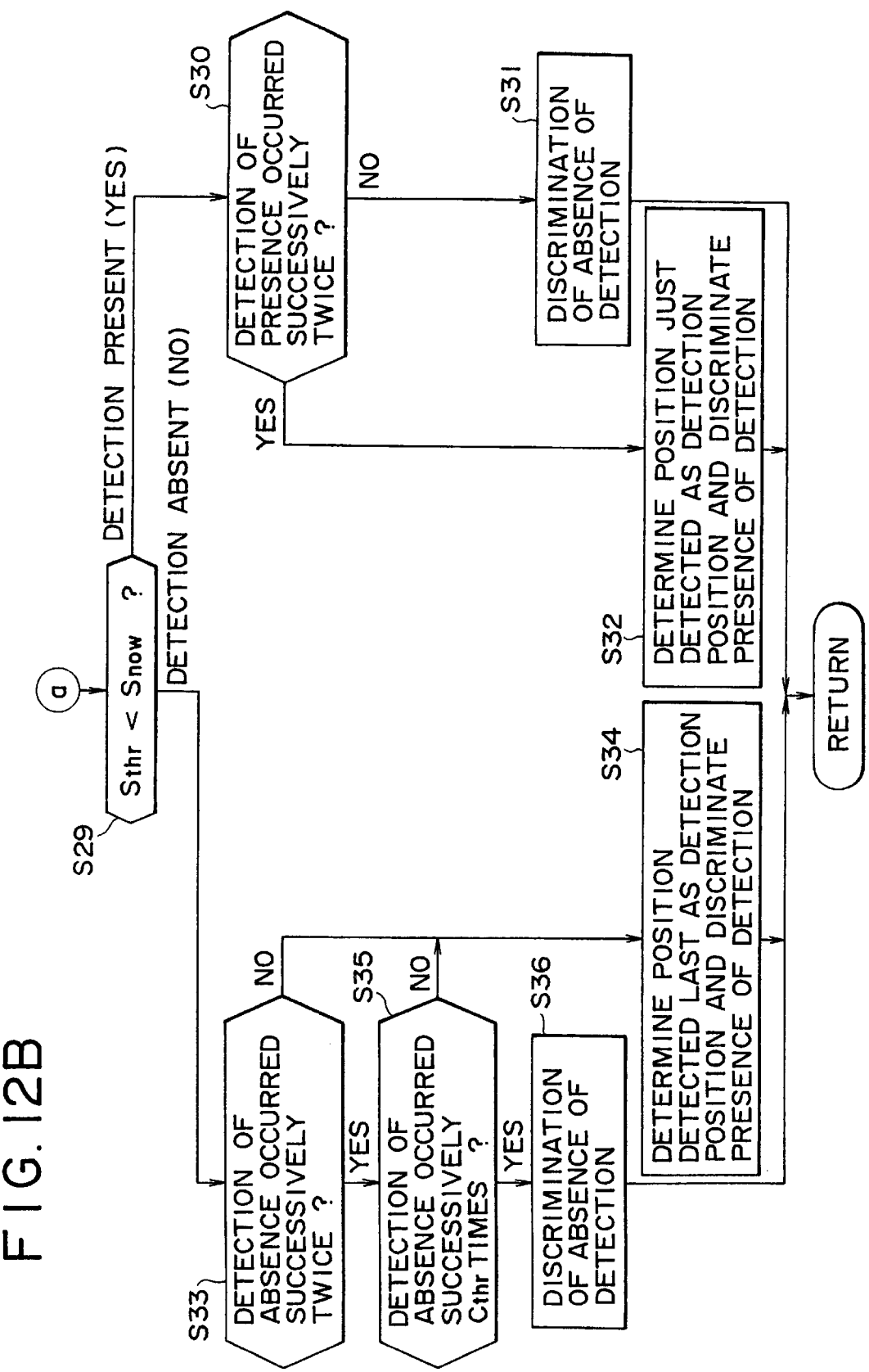

Subsequently, the motion detection processing in step S9 of FIG. 11 will be described in more detail with reference to FIG. 12. First in step S21, the brightness threshold value Ythr, hue threshold value Hthr, detection size Sthr or display extension time T3 set by manual operation of the brightness threshold value setting apparatus 29, hue threshold value setting apparatus 30, detection size setting apparatus 31 or display time setting apparatus 32 is acquired by the brightness comparator 18, color comparator 19, detection area discrimination section 23 or dead zone processing section 24. Further, in step S21, also the dead times T1 and T2 set by manual operation of the dead zone time setting apparatus 33 are acquired by the dead zone processing section 24.

Then, the control sequence advances to step S22, in which the detection region set by manual operation of the detection region setting apparatus 28 is acquired by the detection region read-out sections 16 and 17, whereafter the control sequence advances to step S23. In step S23, hues HUEorg or HUEnow of the pixels which form the detection region are read out from the reference image memory 14 or the current image memory 12 by the detection region read-out section 17 and outputted to the color comparator 19, by which those pixels which exhibit a variation in hue are detected. Thereafter, the control sequence advances to step S24, in which isolated point removal processing is performed for the pixels detected in step S24 and exhibiting a variation in hue. Then, hue variation points obtained as a result of the isolated point removal processing are stored into the evaluation result memory 22.

Thereafter, in step S25, the brightnesses Yorg or Ynow of the pixels which form the detection region are read out from the reference image memory 14 or the current image memory 12 by the detection region read-out section 16 and outputted to the brightness comparator 18, by which those pixels which exhibit a variation in brightness are detected. Thereafter, the control sequence advances to step S26, in which isolated point removal processing is performed for the pixels detected in step S24 and exhibiting a variation in brightness, and brightness variation points obtained as a result of the isolated point removal processing are stored into the evaluation result memory 22.

It is to be noted that the processing in steps S23 and S25 and the processing in steps S24 and S26 are actually performed individually simultaneously by the motion detection apparatus 15 of FIG. 1.

After the processing in step S26, the stored contents of the evaluation result memory 22 are referred to by the detection area discrimination section 23 to count the number of the variation points in step S27. And, where the number of the variation points obtained by the counting operation is represented by Snow, it is discriminated in step S29 by the detection area discrimination section 23 whether or not the number Snow of the variation points is larger than the detection size Sthr.

If it is discriminated in step S29 that the number Snow of the variation points is larger than the detection size Sthr, that is, when motion is detected, the control sequence advances to step S30, in which it is discriminated by the dead zone processing section 24 whether or not detection of motion in step S29 occurs successively twice or more. If it is discriminated in step S30 that detection of motion in step S29 does not occur successively twice or more, or in other words, when detection of motion in step S29 occurs only once, the control sequence advances to step S31, in which it is determined that motion has not been detected and the motion detection processing is completed. In this instance, the motion detection region supplied from the detection area discrimination section 23 is not outputted from the dead zone processing section 24.

On the contrary, if it is discriminated in step S30 that detection of motion in step S29 occurs successively twice or more, then the control sequence advances to step S32, in which it is determined that motion was detected at the timing at which the motion was detected in step S29 and the motion detection processing is completed. In this instance, outputting of the motion detection region supplied from the detection area discrimination section 23 is started by the dead zone processing section 24.

On the other hand, if it is discriminated in step S29 that the number Snow of the variation points is not larger than the detection size Sthr, that is, when no motion is detected, the control sequence advances to step S33, in which it is discriminated by the dead zone processing section 24 whether or not the discrimination in step S29 that no motion is detected occurs successively twice or more. If it is discriminated in step S33 that the discrimination in step S29 that no motion is detected does not occur successively twice or more, that is, when the discrimination in step S29 that no motion is detected occurs only once, the control sequence advances to step S34, in which it is determined that motion was detected at the timing at which the motion was detected last in step S29 and the motion detection processing is completed. In this instance, the motion detection region supplied from the detection area discrimination section 23 continues to be outputted from the dead zone processing section 24.

On the other hand, when it is discriminated in step S33 that the discrimination in step S29 that no motion is detected occurs successively twice or more, the control sequence advances to step S35, in which it is discriminated by the dead zone processing section 24 whether or not the discrimination in step S29 that no motion is detected occurs successively by a number of times Cthr corresponding to the display extension time T3. If it is discriminated in step S35 that the discrimination in step S29 that no motion is detected does not occur successively by the number of times Cthr corresponding to the display extension time T3, the control sequence advances to step S34, in which the processing described above is performed and the motion detection processing is completed. Also in this instance, the motion detection region supplied from the detection area discrimination section 23 continues to be outputted from the dead zone processing section 24.

On the other hand, when it is discriminated in step S35 that the discrimination in step S29 that no motion is detected occurs successively by the number of times Cthr corresponding to the display extension time T3, the control sequence advances to step S36, in which it is determined that no motion is detected any more and the motion detection processing is completed. In this instance, outputting of the motion detection region from the dead zone processing section 24 is stopped.

Of the processing described above, the processing in steps S30 and S33 corresponds to the dead zone processing, and the processing in step S35 corresponds to the display time extension processing. It is to be noted that, while, in the processing of FIG. 12, the number of times by which motion is detected successively and the number of times by which motion is not detected successively, which are used for the discrimination processing in steps S30 and S33, respectively, are each set to the fixed number "2", those number of times correspond to the dead times T1 and T2, respectively, and can be set arbitrarily by manually operating the dead zone time setting apparatus 33 as described hereinabove.

Subsequently, operations when the combination setting apparatus 27 is set to the independent mode and when the combination setting apparatus 27 is set to the combination mode while a plurality of detection regions are set will be described with reference to FIG. 13.

Figure 13A:
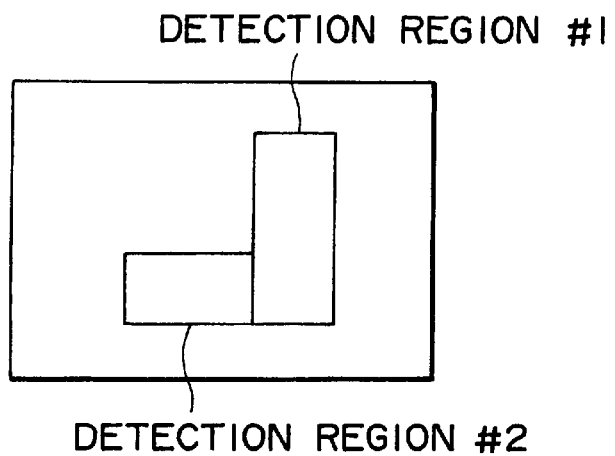
FIGS. 13A to 13C are diagrammatic views illustrating an independent mode and a combination mode employed in the video camera system of FIG. 1.
Figure 13B:
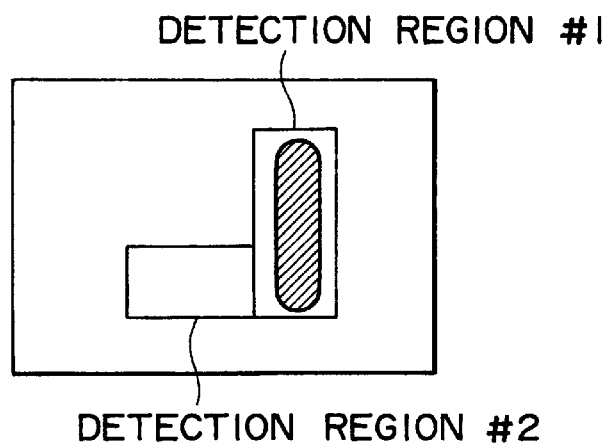

Now, where, for example, two detection regions #1 and #2 are set as shown in FIG. 13A, if the combination setting apparatus 27 is set to the independent mode, then the detection regions #1 and #2 are treated independently of each other. Accordingly, the detection area discrimination section 23 detects motion for each of the detection regions #1 and #2. In particular, for example, if the detection size is set to 50% of the detection region or the like, when a motion detection region is a portion of the display screen having slanting lines added thereto in FIG. 13B, it is determined that motion has occurred only in the detection region #1.

Figure 13C:
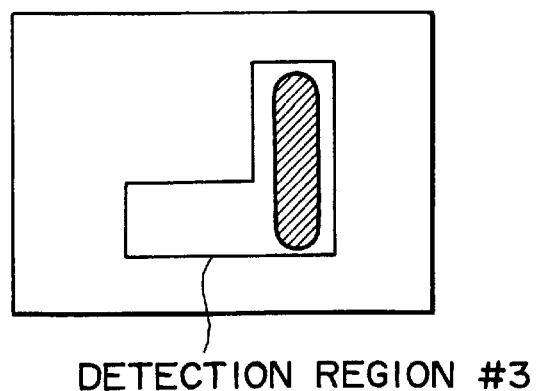

On the other hand, when the combination setting apparatus 27 is set to the combination mode, the detection regions #1 and #2 are treated as a single region or combination region #3 which includes both of them as seen in FIG. 13C. Accordingly, the detection area discrimination section 23 detects motion from the region #3. In particular, for example, if, similarly as in the case described above, the detection size is set to 50% of the detection region or the like and the motion detection region is a portion of the display screen having slanting lines added thereto in FIG. 13C, it is determined that motion has occurred in the region #3, that is, in the detection regions #1 and #2.

It is to be noted that, while, in the present embodiment, the hue and the saturation are used as color information regarding the color of an image, some other information criterion than them may possibly be used.

Further, while, in the present embodiment, a motion detection region is displayed, it is otherwise possible to display, for example, a detection region including a motion detection region or the center or the center of gravity of a motion detection region.

Having now fully described the invention, it will be apparent to one of ordinary skill in the art that many changes and modifications can be made thereto without departing from the spirit and scope of the invention as set forth herein.

What is claimed is:

1. A motion detection apparatus for detecting motion of an inputted image, comprising:

reference image storage means for storing the image as a reference image to be used as a reference for detection of motion;

updating means for updating the reference image stored in said reference image storage means, said updating means being operable in at least three alternative updating modes: an unconditional updating mode in which the reference image is periodically updated, a conditional updating mode in which the reference image is periodically updated until motion is detected whereupon updating of the reference image is inhibited, and an updating inhibition mode in which the reference image is not updated;

current image storage means for storing an image inputted now as a current image;

motion detection means for comparing the current image stored in said current image storage means with the reference image stored in said reference image storage means and detecting motion of the image based on a result of the comparison; and extension means for extending an interval within which motion of the image is detected by said motion detection means by a predetermined extension time.

2. A motion detection apparatus according to claim 1, further comprising extension time setting means for setting the predetermined extension time.

3. A motion detection apparatus according to claim 1, further comprising updating periodical setting means for setting an updating period of the reference image by said updating means.

4. A motion detection method for detecting motion of an inputted image, comprising the steps of:

storing an image inputted as a reference image to be used as a reference for detection of motion;

storing an inputted image as a current image;

comparing the reference image and the current image with each other and detecting motion of the image based on a result of the comparison;

extending an interval within which motion of the image is detected by a predetermined time; and updating the reference image according to one of at least three alternative updating procedures: periodically updating the reference image; periodically updating the reference image until motion is detected whereupon updating of the reference image is inhibited, and not updating the reference image.

5. A motion detection apparatus for detecting motion of an inputted image, comprising:

reference image storage means for storing the image as a reference image to be used as a reference for detection of motion;

updating means for updating the reference image stored in said reference image storage means, said updating means being operable in at least three alternative updating modes: an unconditional updating mode in which the reference image is periodically updated, a conditional updating mode in which the reference image is periodically updated until motion is detected whereupon updating of the reference image is inhibited, and an updating inhibition mode in which the reference image is not updated;

current image storage means for storing an image inputted now as a current image;

motion detection means for comparing the current image stored in said current image storage means with the reference image stored in said reference image storage means and detecting motion of the image based on a result of the comparison; and selection means for selecting an updating method of the reference image by said updating means from among a plurality of methods.

6. A motion detection apparatus according to claim 5, wherein when the updating means is operating in the unconditional updating mode the reference image is periodically updated by replacing the reference image with the current image, and when the updating means is operating in the conditional updating mode the reference image is periodically updated by replacing the reference image with the current image until motion is detected.

7. In a motion detection method for a motion detection apparatus which includes reference image storage means for storing an inputted image as a reference image to be used as a reference for detection of motion, updating means for updating the reference image stored in said reference image storage means, current image storage means for storing an image inputted now as a current image, and motion detection means for comparing the current image stored in said current image storage means with the reference image stored in said reference image storage means and detecting motion of the image based on a result of the comparison, the improvement wherein an updating method of the reference image by said updating means is selectable from among at least three updating methods: an unconditional updating method in which the reference image is periodically updated, a conditional updating method in which the reference image is periodically updated until motion is detected whereupon updating of the reference image is inhibited, and an updating inhibition method in which the reference image is not updated.

8. A motion detection apparatus for detecting motion of an inputted image, comprising:

reference image storage means for storing the image as a reference image to be used as a reference for detection of motion;

updating means for updating the reference image stored in said reference image storage means, said updating means being operable in at least three updating modes: an unconditional updating mode in which the reference image is periodically updated, a conditional updating mode in which the reference image is periodically updated until motion is detected whereupon updating of the reference image is inhibited and an updating inhibition mode in which the reference image is not updated;

current image storage means for storing an image inputted now as a current image;

brightness information comparison means for comparing brightness information regarding brightness of the current image stored in said current image storage means and the reference image stored in said reference image storage means to each other;

color information comparison means for comparing color information regarding colors of the current image stored in said current image storage means and the reference image stored in said reference image storage means to each other; and motion detection means for detecting motion of the image based on results of the comparison by both of said brightness information comparison means and said color information comparison means.

9. A motion detection apparatus according to claim 8, wherein the color information includes a hue of a color of each of pixels which form the reference image or the current image.

10. A motion detection apparatus according to claim 8, wherein the color information includes information of whether a color of each of pixels which form the reference image or the current image is a chromatic color or an achromatic color.

11. A motion detection apparatus according to claim 10, further comprising saturation detection means for detection a saturation of each of pixels which form the reference image or the current image, and chromatic/achromatic color discrimination means for discriminating based on the saturation detected by said saturation detection means whether the color of each of the pixels which form the reference image or the current image is a chromatic color or an achromatic color.

12. A motion detection apparatus according to claim 8, further comprising imaging means for imaging an object to be imaged and outputting an image signal corresponding to the image, and wherein an exposure state of said image is fixed to a state for imaging of the reference image for a time until the reference image stored in said reference image storage means is updated by said updating means.

13. A motion detection apparatus according to claim 8, further comprising motion detection range setting means for setting a range within which motion of the image is to be detected, and wherein said motion detection means detects motion within the range set by said motion detection range setting means.

14. A motion detection apparatus according to claim 13, further comprising range selection means for selecting, when a plurality of ranges are set by said motion detection range setting means, whether the plurality of ranges should be treated as independent ranges of each other or as a single range.

15. A motion detection apparatus according to claim 8, wherein said brightness information comparison means calculates a brightness difference value which is a difference in brightness information between the reference image and the current image, and said color information comparison means calculates a color difference value which is a difference in color information between the reference image and the current image, and besides said motion detection means detects motion of the image based on both of the brightness difference value and the color difference value.

16. A motion detection apparatus according to claim 15, wherein said motion detection means detects motion of the image by detecting, based on a relationship in magnitude between the brightness difference value and a predetermined threshold value, whether each of the pixels which form the image exhibits a variation.

17. A motion detection apparatus according to claim 16, further comprising threshold value setting means for setting the predetermined threshold value.

18. A motion detection apparatus according to claim 16, wherein said motion detection means discriminates whether a variation is detected with pixels around the pixel with which a variation has been detected, and determines based on a result of the discrimination that the pixel with which the variation has been detected does not exhibit the variation.

19. A motion detection apparatus according to claim 15, wherein said motion detection means detects motion of the image by detecting, based on a relationship in magnitude between the color difference value and a predetermined threshold vale, whether or not each of the pixels which form the image exhibits a variation.

20. A motion detection apparatus according to claim 19, further comprising threshold value setting means for setting the predetermined threshold value.

21. A motion detection apparatus according to claim 19, wherein said motion detection means discriminates whether a variation is detected with pixels around the pixel with which a variation has been detected, and determines based on a result of the discrimination that the pixel with which the variation has been detected does not exhibit the variation.

22. A motion detection apparatus according to claim 8, where said motion detection means detects, based on results of the comparison by both of said brightness information comparison means and said color information comparison means, whether each of pixels which form the image exhibits a variation, and discriminates, based on a relationship in magnitude between an area of a region formed by those of the picture elements with which a variation has been detected and a predetermined area, whether or not motion is involved in the region.

23. A motion detection apparatus according to claim 22, further comprising area setting means for setting the predetermined area.

24. A motion detection apparatus according to claim 8, wherein said motion detection means detects, based on results of the comparison by both of said brightness information comparison means and said color information comparison means, whether each of pixels which form the image exhibits a variation, and outputs, when a variation of a pixel is still detected after a predetermined first interval elapses after detection of a variation of the pixel is started, information representing that motion of the image has been detected.

25. A motion detection apparatus according to claim 24, wherein said motion detection means stops outputting of the information representing that motion of the image has been detected if the variation of the image is not detected any more after lapse of a second interval after it becomes, after detection of a variation of the pixel is started, that the variation is not detected any more.

26. A motion detection apparatus according to claim 8, further comprising display means for displaying a result of the motion detection by said motion detection means in a superimposed state with the image.

27. A motion detection apparatus according to claim 26, wherein said display means is capable of setting whether or not a result of the motion detection by said motion detection means should be displayed.

28. A motion detection apparatus according to claim 8, further comprising outputting means for outputting a result of the motion detection by said motion detection means to the outside.

29. A motion detection method for detecting motion of an inputted image, comprising the steps of:

storing the image as a reference image to be used as a reference for detection of motion and storing an image inputted now as a current image;

updating the reference image according to one of at least three alternative updating methods: an unconditional updating method in which the reference image is periodically updated, a conditional updating method in which the reference image is periodically updated until motion is detected whereupon updating of the reference image is inhibited, and an updating inhibition method in which the reference image is not updated;

comparing brightness information regarding brightness of the reference image and the current image with each other and comparing color information regarding a color between the reference image and the current image with each other; and detecting motion of the image based on both results of the comparison.

* * * * *